United States Patent [19]
Tanaka et al.

[11] Patent Number: 5,634,332
[45] Date of Patent: Jun. 3, 1997

[54] EXHAUST GAS PURIFICATION APPARATUS

[75] Inventors: Masakazu Tanaka, Okazaki; Hiroshi Mori, Ichinomiya; Makoto Saito, Nishio; Mamoru Mabuchi; Hiroyuki Usami, both of Kariya; Takahiko Yamamoto, Obu, all of Japan

[73] Assignee: Nippondenso Co., Ltd., Kariya, Japan

[21] Appl. No.: 401,915

[22] Filed: Mar. 9, 1995

Related U.S. Application Data

[63] Continuation-in-part of Ser. No. 120,384, Sep. 14, 1993, abandoned.

[30] Foreign Application Priority Data

| Sep. 16, 1992 | [JP] | Japan | 4-246903 |
| Feb. 4, 1993 | [JP] | Japan | 5-040501 |
| Feb. 25, 1993 | [JP] | Japan | 5-061036 |
| Apr. 13, 1994 | [JP] | Japan | 6-074735 |
| Jul. 27, 1994 | [JP] | Japan | 6-175639 |
| Sep. 9, 1994 | [JP] | Japan | 6-215729 |
| Oct. 3, 1994 | [JP] | Japan | 6-238889 |

[51] Int. Cl.$^6$ ............................ F01N 3/28
[52] U.S. Cl. ............. 60/284; 60/288; 60/297
[58] Field of Search ............ 60/274, 279, 297, 60/288, 284

[56] References Cited

U.S. PATENT DOCUMENTS

| 3,090,677 | 5/1963 | Scheitlin . |
| 3,645,098 | 2/1972 | Templin et al. . |

(List continued on next page.)

FOREIGN PATENT DOCUMENTS

| 318462 | 5/1989 | European Pat. Off. . |
| 378797 | 7/1990 | European Pat. Off. . |

(List continued on next page.)

OTHER PUBLICATIONS

Patent Abstracts of Japan: vol. 15, No. 457(M1181), Nov. 1991 re JP A 3194113.

(List continued on next page.)

Primary Examiner—Douglas Hart
Attorney, Agent, or Firm—Cushman Darby & Cushman Intellectual Property Group of Pillsbury Madison & Sutro LLP

[57] ABSTRACT

Two flow paths separated by a partition wall having a bore formed downstream of a catalyst unit provided in an exhaust pipe of an internal combustion engine. Adsorption means for adsorbing an HC component of an exhaust gas of the internal combustion engine is provided in one of the flow paths. When a temperature of the exhaust gas is above a predetermined level, the exhaust gas flows through the other flow path by means of a change-over valve. Because the bore is provided in the partition wall, the adsorption means is exposed to the exhaust gas and the HC component adsorbed by the adsorption means is easily desorbed because of the high temperature of the exhaust gas. A one-way valve which repeatedly performs an opening/closing operation due to pulsation of the exhaust gas, is provided between recirculation flow pipes. A position of the one-way valve between the recirculation flow pipes is determined so that a phase difference between the exhaust gas pulsation applied to the valve from the upstream side of the catalyst unit and the exhaust gas pulsation applied to the valve from the flow path of the adsorption means, inverts substantially by half-wavelength producing a large differential pressure applied to both the front and rear surfaces across the one-way valve, thereby rapidly recirculating the desorbed HC from the adsorption means to the catalyst unit. When the change-over valve is operated to a position shown by a dotted line to flow the exhaust gas through the adsorption means, the flow-in velocity of the exhaust gas flowing into the adsorption means is made uniform by the rectifying plate, thereby improving HC or the like adsorbing efficiency. When the change-over valve is turned to a position shown by a solid line for opening the exhaust gas flow path, so that the exhaust gas flows through the exhaust gas flow path, the rectifying plate prevents vortices from occurring on the upstream side of the adsorption means to thereby keep the once-adsorbed HC or the like from flowing out toward the exhaust gas pipe.

22 Claims, 18 Drawing Sheets

U.S. PATENT DOCUMENTS

| | | |
|---|---|---|
| 3,699,683 | 10/1972 | Tourtellotte et al. . |
| 3,813,226 | 5/1974 | Heitland et al. . |
| 3,892,536 | 7/1975 | Roeser et al. . |
| 4,934,142 | 6/1990 | Hayashi et al. . |
| 4,985,210 | 1/1991 | Minami . |
| 5,051,244 | 9/1991 | Dunne et al. . |
| 5,125,231 | 6/1992 | Patil et al. . |
| 5,140,811 | 8/1992 | Minami et al. . |
| 5,142,864 | 9/1992 | Dunne . |
| 5,158,753 | 10/1992 | Take et al. . |
| 5,307,627 | 5/1994 | Christensen ............................ 60/297 |
| 5,315,824 | 5/1994 | Takeshima . |
| 3,657,892 | 4/1972 | Perga et al. . |

FOREIGN PATENT DOCUMENTS

| | | |
|---|---|---|
| 460542 | 12/1991 | European Pat. Off. . |
| 485179 | 5/1992 | European Pat. Off. . |
| 588315 | 3/1994 | European Pat. Off. . |
| 3627637 | 10/1987 | Germany . |
| 4113293 | 4/1992 | Germany . |
| 4328125 | 2/1994 | Germany . |
| 54-13815 | 2/1979 | Japan . |
| 2-75327 | 3/1990 | Japan . |
| 2-86910 | 3/1990 | Japan . |
| 2135126 | 5/1990 | Japan . |
| 3141816 | 6/1991 | Japan . |
| 3194113 | 8/1991 | Japan . |
| 4-17710 | 1/1992 | Japan . |
| 4311618 | 11/1992 | Japan . |
| 5-44446 | 2/1993 | Japan . |
| 5-57138 | 3/1993 | Japan . |
| 5149131 | 6/1993 | Japan . |
| 674020 | 3/1994 | Japan . |
| 60-93850 | 4/1994 | Japan . |
| 1395960 | 5/1975 | United Kingdom . |
| 422432 | 4/1991 | European Pat. Off. . |

OTHER PUBLICATIONS

Patent Abstracts of Japan: vol. 11, No. 397(M655), Dec. 1987 re JP A 62162715.

Patent Abstracts of Japan: vol. 12, No. 039(M665), Feb. 1988 re JP A 62191609.

Heimrich et al: "Cold–Start Hydrocarbon Collection for Advanced Exhaust Emission Control", SAE Technical Paper Series #920847, 1992.

Patent Abstracts of Japan, vol. 17 No. 374 (M–1445), Jul. 1993 re JP–A–50 59942.

Patent Abstracts of Japan, vol. 12 No. 39 (M–665), Feb. 1988 re JP–A–62 191609.

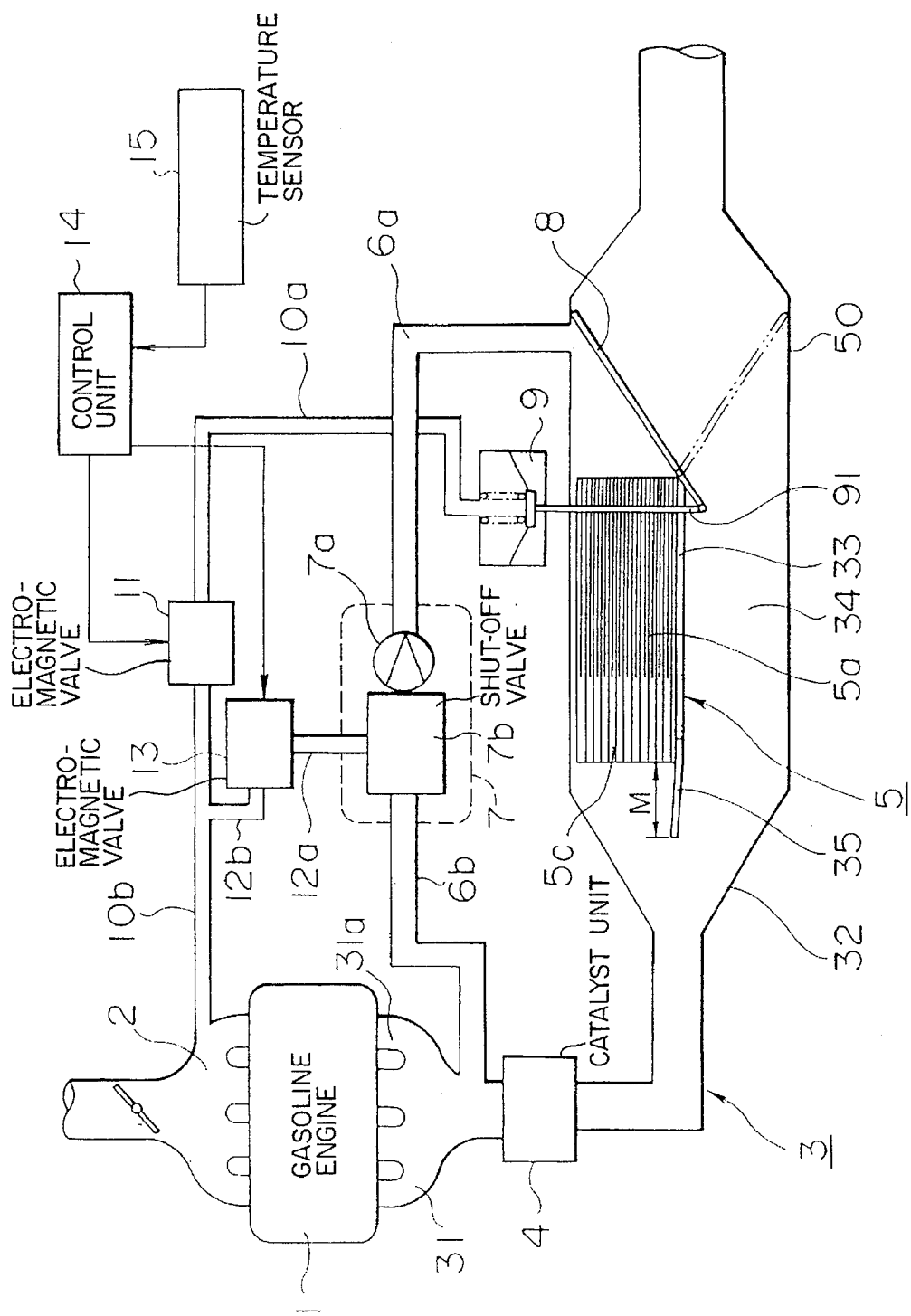

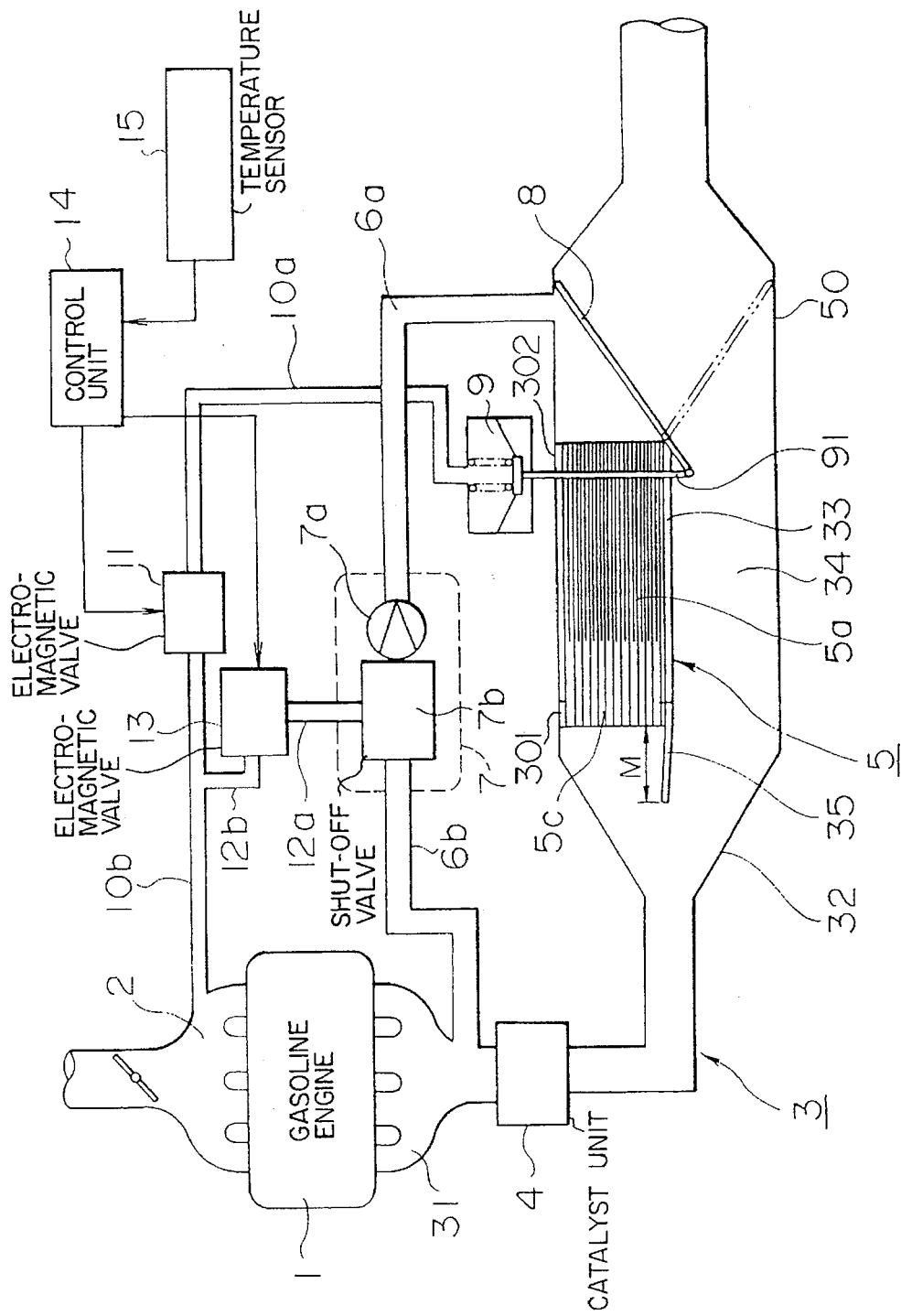

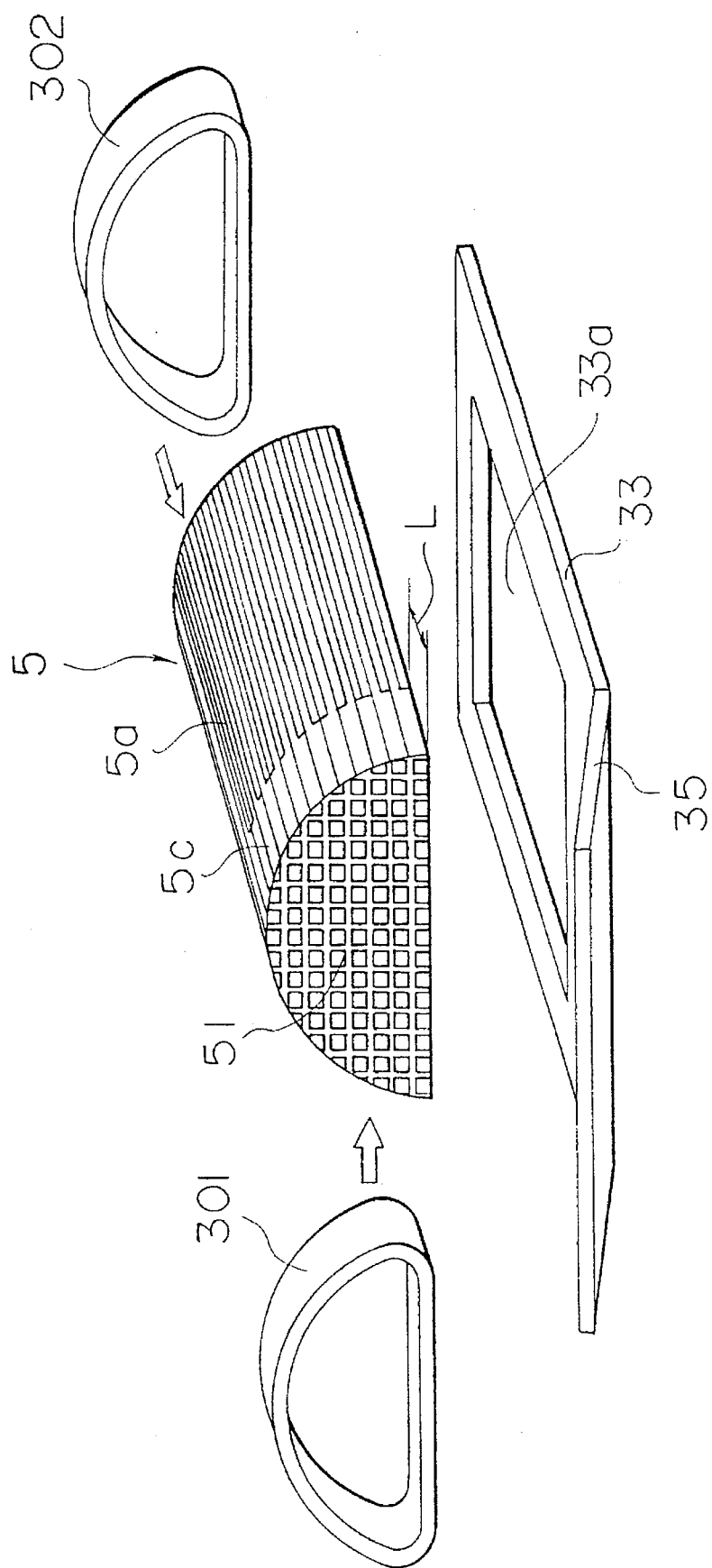

EXHAUST GAS PURIFICATION APPARATUS

CROSS REFERENCE TO RELATED APPLICATION

This is a continuation in part of patent application Ser. No. 08/120,384 filed on Sep. 14, 1993, now abandoned, the content of which is herein incorporated by reference.

BACKGROUND OF THE INVENTION

1. Field of the Invention

The present invention relates to an exhaust gas purification apparatus, and more particularly, to an apparatus for purifying an exhaust gas discharged from an internal combustion engine used in an automobile or the like.

2. Description of the Related Art

For the purpose of purifying an exhaust gas of an automobile, there exist an exhaust gas purifying method and an exhaust gas purification apparatus, which employ an adsorbent carrying noble metal (platinum, rhodium or the like) as a catalyst. In the above-described method and apparatus, it is generally necessary that the adsorbent be at a temperature equal to or higher than a catalyst activating temperature of 350° C. in order to purify HC in the exhaust gas.

However, the conventional art has a problem in that HC is hardly purified immediately after the start of the engine because the temperature of the aforesaid catalyst does not reach the catalyst activating temperature.

To solve this problem, there has been proposed a purification apparatus including a catalyst unit provided in an exhaust system of an engine and an HC trapper containing an adsorbent for adsorbing HC (which will be referred to as cold HC) discharged when the engine is in a cool state, which HC trapper is disposed on the upstream or downstream side of the catalyst unit (Japanese Patent Unexamined Publication Nos. 2-135126, 4-17710 and 4-311618).

The purification apparatus disclosed in Japanese Patent Unexamined Publication No. 2-135126 employs an adsorbent unit and a catalyst unit in combination, which adsorbent unit using a zeolitic adsorbent is located on the upstream side of the catalyst unit. In this apparatus, cold HC is adsorbed by the adsorbent when an exhaust gas is at a low temperature and the HC desorbed from the adsorbent and HC discharged from the engine are purified by the catalyst unit when the exhaust gas is at a high temperature.

In each of the purification apparatuses disclosed in Japanese Patent Unexamined Publication Nos. 4-17710 and 4-311618, an HC trapper containing an absorbent is provided on the downstream side of a catalyst unit in parallel with a main exhaust pipe, and flow-path change-over valves are provided respectively in a bypass pipe including the trapper and the main exhaust pipe. These valves are operated for a certain period of time immediately after the start of an engine so that an exhaust gas flows through the bypass pipe, during which cold HC is adsorbed by the trapper. Upon a lapse of the certain period of time after the start of the engine, during which the temperature of the exhaust gas rises and the cold HC is brought into a state in which it is desorbed from the adsorbent of the HC trapper, the valves are turned to positions for flowing the exhaust gas into the main exhaust pipe. At this time, a negative pressure in an intake pipe of the engine is applied to a desorption pipe connecting the downstream side of the trapper to the intake pipe of the engine, so that the desorbed HC is sucked into the intake pipe so as to be burned again in the engine.

Further, Japanese Patent Unexamined Publication No. 4-311618 discloses an example in which desorbed HC is sucked to return to the upstream side of a catalyst by means of a suction pump.

Among the above-described conventional techniques for adsorbing cold HC, the technique including the HC trapper provided on the upstream side of the catalyst unit has a problem in that the adsorbing capacity of the adsorbent is impaired by the high-temperature exhaust gas which flows in the HC trapper immediately after it is discharged from the engine. In view of the above, the apparatus disclosed in Japanese Patent Unexamined Publication No. 2-135126 uses the zeolitic type adsorbent having a high heat resistance. However, the adsorbing capacity of the adsorbent is generally higher as it is at a lower temperature. Even the zeolitic type adsorbent desorbs HC before the catalyst reaches an activating temperature. Accordingly, the adsorbed HC is discharged to the atmosphere without being purified. Further, when the HC trapper is provided upstream of the catalyst unit, since the trapper itself possesses a large heat capacity, there arises a problem in that a time required for activating the catalyst or a time required until the catalyst reaches an activating temperature is delayed.

On the other hand, the apparatus disclosed in Japanese Patent Unexamined Publication No. 4-17710 or 4-311618 in which the HC trapper is provided downstream of the catalyst unit, solves the above-described problems in respect of the cold HC adsorbing capacity and the catalyst activation. However, the heat of the exhaust gas is conducted to the adsorbent slowly through the bypass pipe and it takes a long time to desorb the HC from the absorbent, so that the desorption is not always completed. If this unfavorable state is repeated, HC is accumulated in the adsorbent, and the adsorbent is saturated with too much HC to adsorb the same. Further, when the exhaust gas containing HC is returned to the intake pipe, an error occurs in the air-fuel ratio control of the engine, so that an adverse effect may be caused on fuel consumption, exhaust gas purification or drivability.

According to the apparatus of the type in which the desorbed HC is sucked to return to the upstream side of the catalyst by means of the suction pump, the aforesaid problems can be solved because an error hardly occurs in the air-fuel ratio control of the engine. However, it is difficult and expensive to develop a suction pump which can withstand severe exhaust-gaseous conditions (high-temperature, high-humidity and highly-corrosive atmosphere) for a long period of time. Therefore, this apparatus cannot be easily realized and it conclusively lacks mass productivity.

In view of the above, the inventors of the present invention propose in Japanese Patent Application No. 5-61036 an exhaust gas purification apparatus which can solve almost all the above-described problems. More specifically, in the apparatus of Japanese Patent Application No. 5-61036, an HC trapper is provided on the downstream side of a catalyst unit, and the HC trapper is provided in one exhaust pipe and an interior of the trapper is partitioned in place of providing a bypass pipe. With such structure, the heat of the exhaust gas is preferably conducted to the adsorbent so as to promote the desorption of HC.

Also, there is provided a recirculation flow pipe including a one-way valve between the upstream side of the catalyst unit and the HC trapper. The desorbed HC is returned to the upstream side of the catalyst unit by the pulsation of the exhaust gas through the recirculation flow pipe, and the returned HC is purified by the catalyst.

As a result of further investigations by the inventors of this invention after the above application, it has become apparent that the flow rate of recirculation through the flow pipe is increased or decreased depending on the position of provision of the one-way valve within the recirculation flow pipe which valve receives the exhaust gas pulsation. It has also become apparent that the flow rate of recirculation is increased or decreased depending on the position of a port of the recirculation flow pipe provided in an exhaust manifold.

SUMMARY OF THE INVENTION

In view of the above, it is an object of the present invention to provide an exhaust gas purification apparatus in which the emission of a harmful component in an exhaust gas can be prevented when an engine is in a cool state, HC adsorbed by an adsorbent is desorbed in a short period of time and returned to a catalyst unit when the engine is warmed up, and an adverse effect on the engine caused by the recirculation of HC is minimized as far as possible.

Another object of the present invention is to provide an exhaust gas purification apparatus which is based on Japanese Patent Unexamined Application No. 5-61036, in which by effectively utilizing pulsation of an exhaust gas, a flow rate of recirculation is increased, and HC desorbed during warming up an engine is recirculated to a catalyst unit without leakage in a short period of time, so as to be purified by the catalyst.

A further object of the present invention is to provide an exhaust gas purification apparatus including exhaust-gas-flow-path change-over means for switching a flow path of adsorption means and an exhaust gas flow path forming a flow of an exhaust gas which does not pass through the adsorption means, wherein the exhaust-gas-flow-path change-over means is provided only on the downstream side of the adsorption means to thereby simplify the structure of the apparatus, and a rectifying plate for rectifying a flow of the exhaust gas is provided upstream of the adsorption means, so that a flow velocity of the exhaust gas flowing into the adsorption means is uniformly distributed, adsorbing efficiency of the adsorption means can be improved, and during desorbing a harmful component such as HC or the like, the once-adsorbed HC is prevented from flowing out toward the exhaust gas flow path.

To achieve the above-described objects, there is provided an exhaust gas purification apparatus comprising: a catalyst unit provided in an exhaust pipe of an internal combustion engine; an adsorbent for adsorbing a harmful component of an exhaust gas of the internal combustion engine, the adsorbent being provided downstream of the catalyst unit; recirculation means for recirculating the harmful component of the exhaust gas adsorbed by the adsorbent to the upstream side of the catalyst unit; and change-over means for switching a course of flowing the exhaust gas of the internal combustion engine, so that the exhaust gas passes through the adsorbent where the harmful component of the exhaust gas is adsorbed when a temperature of the exhaust gas of the internal combustion engine is below a predetermined level, and that the exhaust gas does not pass through the adsorbent when the temperature of the exhaust gas of the internal combustion engine is above the predetermined level, wherein the adsorbent is exposed to the exhaust gas when the temperature of the exhaust gas of the internal combustion engine is above the predetermined level.

According to one aspect of the invention, there is provided an exhaust gas purification apparatus comprising:

a catalyst unit provided in an exhaust pipe of an engine;

adsorption means which carries an adsorbent for adsorbing a harmful component of an exhaust gas, the adsorption means being provided in the exhaust pipe downstream of the catalyst unit;

an exhaust gas flow path for forming a flow of the exhaust gas which does not pass through the adsorption means, the exhaust gas flow path being provided in the exhaust pipe downstream of the catalyst unit;

recirculation flow pipes for connecting a flow path of the adsorption means and the upstream side of the catalyst unit;

flow controlling means provided between the recirculation flow pipes so as to be actuated by pulsations of the exhaust gas, the means controlling a flow in the pipes only in one direction from the adsorption means to the catalyst unit;

exhaust-gas-flow-path change-over means which can selectively change over a course of flowing the exhaust gas between the adsorption means and the exhaust gas flow path; and control means for controllably turning the change-over means to a position where the exhaust gas is made to flow through the adsorption means when the engine is in a cool state and a position where the exhaust gas is made to flow through the exhaust gas flow path when the engine is warmed up, wherein a position of the flow controlling means between the recirculation flow pipes is predetermined so that the flow controlling means is operated by a differential pressure by a phase difference between exhaust gas pulsation applied to the means from the upstream side of the catalyst unit and exhaust gas pulsation applied to the means from the flow path of the adsorption means.

According to another aspect of the present invention, there is provided an exhaust gas purification apparatus comprising:

a catalyst unit provided in an exhaust pipe of an engine;

adsorption means which carries an adsorbent for adsorbing a harmful component of an exhaust gas, the adsorption means being provided in the exhaust pipe downstream of the catalyst unit;

an exhaust gas flow path for forming a flow of the exhaust gas which does not pass through the adsorption means, the exhaust gas flow path being provided in the exhaust pipe downstream of the catalyst unit;

recirculation flow pipes for recirculating the harmful component of the exhaust gas adsorbed by the adsorption means to the upstream side of the catalyst unit;

exhaust-gas-flow-path change-over means provided downstream of the adsorption means, which flow-path change-over means can selectively change over a course of flowing the exhaust gas between a flow path of the adsorption means and the exhaust gas flow path;

rectifying means provided upstream of the adsorption means, which means rectifies a flow of the exhaust gas flowing into the adsorption means so as to uniformly distribute a flow-in velocity of the exhaust gas; and control means for controllably turning the change-over means to a position where the exhaust gas is made to flow through the adsorption means when the engine is in a cool state and a position where the exhaust gas is made to flow through the exhaust gas flow path when the engine is warmed up.

BRIEF DESCRIPTION OF THE DRAWINGS

FIG. 9 is a view showing the overall arrangement of an apparatus according to a fifth embodiment of the invention;

FIG. 14 is a view showing an arrangement of an apparatus according to an eighth embodiment of the invention;

FIG. 15 is a perspective view of a honeycomb member which carries an adsorbent on its semicircular cross-sectional portion, and a partition wall which are employed in the apparatus of the eighth embodiment;

DESCRIPTION OF THE PREFERRED EMBODIMENTS

Preferred embodiments of the present invention will now be described with reference to the accompanying drawings.

Figure 1:
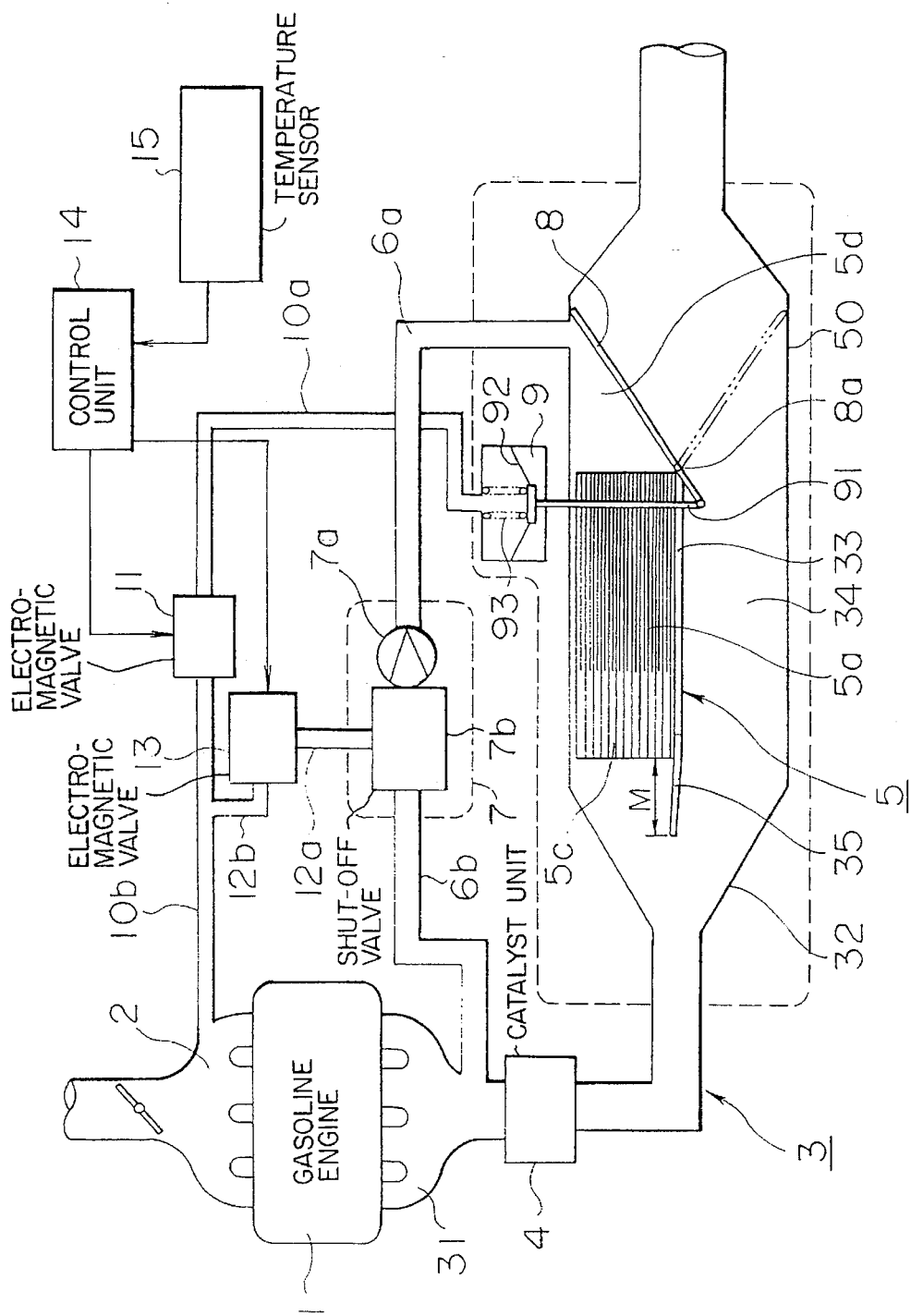
FIG. 1 is a view showing an arrangement of a first embodiment of the present invention.

FIG. 1 shows an example in which the present invention is applied to an exhaust gas purification apparatus for an automobile engine. In the apparatus, an exhaust pipe 3 of the gasoline engine 1 of the automobile includes a catalyst unit 4 located just behind an exhaust manifold 31. The catalyst unit 4 includes therein a honeycomb-like carrier composed of cordierite which carries a three-way type catalyst mainly containing noble metal such as platinum, rhodium or the like.

Figure 2:
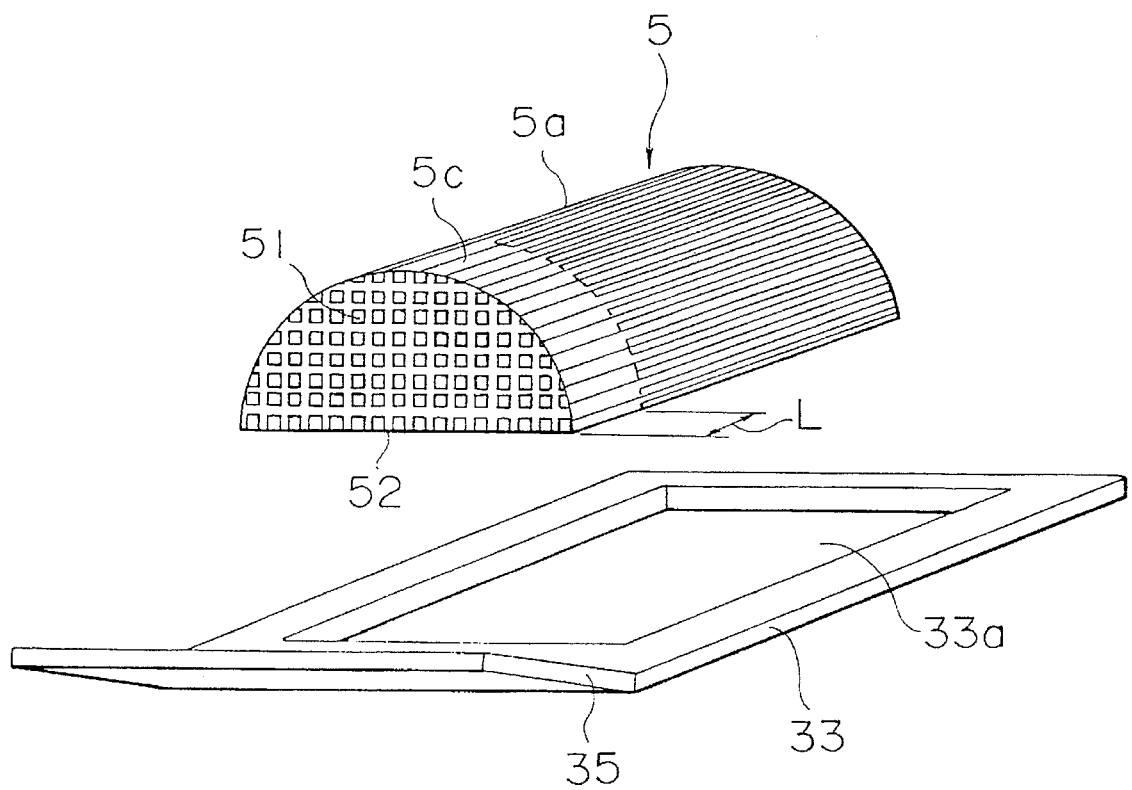
FIG. 2 is a perspective view of a honeycomb member which carries an adsorbent on its semicircular cross-sectional portion, and a partition wall which is employed in the first embodiment.

The exhaust pipe 3 includes an enlarged-diameter portion 32 located on the downstream side of the catalyst unit 4, and a cylindrical adsorption tube 50 formed continuously with the enlarged-diameter portion 32. The adsorption tube 50 contains adsorption means 5 of a honeycomb structure therein. The adsorption means 5 of the honeycomb structure is composed of stainless steel or ceramics such as cordierite or the like. As shown in FIG. 2, the adsorption means 5 is formed in a semi-cylindrical shape so as to occupy a half of a cross-sectional portion of the cylindrical adsorption tube 50 which is continuous with the enlarged-diameter portion 32. Thus, the adsorption means 5 is closely fitted in the adsorption tube 50. The adsorption means 5 is incorporated in the adsorption tube 50 in such a manner that a flat surface 52 of the semi-cylindrical shape of the means 5 is directed to a central portion of the adsorption tube 50.

The adsorption means 5 has a plurality of parallel passing holes 51, as shown in FIG. 2. A zeolitic adsorbent is carried by an adsorbent carrying layer 5a formed over the entire surface of the means 5 except for an upstream end thereof. The zeolitic adsorbent is capable of adsorbing HC gas which is a harmful component in an exhaust gas from the engine 1.

Thus, when a temperature of the exhaust gas of the internal combustion engine is above a predetermined level, the exhaust gas passes through the passing holes provided in the adsorption means. Accordingly, it is possible to effectively desorb the harmful component adsorbed even by a small-sized adsorption means. In addition, the shape of the adsorption means 5 is not restricted to the semi-cylindrical shape, and this means 5 may be formed in an elliptical or rectangular shape. Similarly, the adsorption tube 50 may be formed in an elliptical or rectangular shape in conformity with the shape of the adsorption means 5.

An exhaust-gas-flow-path change-over valve 8 serving as change-over means is provided just behind a downstream (rear) end of the adsorbent carrying layer 5a of the adsorption means 5. The change-over valve 8 is pivotally operated about a point 8a of the support to selectively open or close a flow path 5d of the adsorption means 5 of the honeycomb structure and an exhaust gas flow path 34 adjacent to the flow path 5d. The flow-path change-over valve 8 is connected to an actuator 9 via a shaft 91.

In this connection, since the change-over means is provided only on the downstream side of the adsorption means, when the temperature of the exhaust gas of the internal combustion engine is above a predetermined level, the exhaust gas always collides against the upstream end face of the adsorption means so that the desorption of the harmful component from the adsorption means can be promoted by heat of the exhaust gas.

A distance between the catalyst unit 4 and the adsorption means 5 is set such that a timing at which the catalyst unit 4 is heated by the exhaust gas to reach an activating temperature substantially coincides with a timing at which the adsorbent carried by the adsorption means 5 is heated to lose its adsorbing capacity. That is to say, because the temperature at which the adsorbent carried by the adsorption means 5 loses its adsorbing capacity (in other words, a temperature of 100° C. to 200° C. at which the adsorbent starts to desorb HC) is lower than the catalyst activating temperature of the catalyst unit 4, it is necessary to locate the adsorption means 5 behind the catalyst unit 4 at the predetermined distance, whereby the above-described timings can be coincided with each other.

The adsorption means 5 includes a plate-like partition wall 33 positioned between the flow path 34 and itself. The partition wall 33 separates the adsorption means 5 from the flow path 34 and it presses the adsorption means 5 against the adsorption tube 50 so as to hold the same. An opening portion or bore 33a is formed in the partition wall 33 so that the exhaust gas flowing in the flow path 34 can come into direct contact with the adsorption means 5 through the bore 33a.

By thus forming the opening portion in the partition wall, it is possible to directly expose the exhaust gas discharged from the internal combustion engine to the adsorption means. Therefore, the harmful component can be desorbed from the adsorption means more effectively.

There is provided a rectifying plate 35 having a planar surface on the upstream side of the adsorption means 5, which rectifying plate 35 is formed by extending the partition wall 33. By providing the rectifying plate 35, it is possible to make the flow velocity distribution of the exhaust gas uniform when it flows toward the flow path 5d of the adsorption means 5, thereby improving the HC adsorbing efficiency of the adsorbent. The partition wall 33 and the rectifying plate 35 are made of heat-resisting metal such as stainless steel or the like. They may be integrally formed with each other as shown in FIG. 2, or separately from each other.

In FIG. 1, the rectifying plate 35 is formed to extend straight from the upstream end of the partition wall 33. Alternatively, the rectifying plate 35 may be inclinedly provided to extend upwardly at a small angle with respect to the partition wall 33, as shown in FIG. 2. Optimum values of this angle and a necessary length M of the rectifying plate 35 which realizes uniform distribution of the exhaust gas flow velocity, are determined by an experiment in which the flow velocity distribution of the exhaust gas in the practical arrangement of the adsorption means 5 is measured.

When adsorbing HC, the flow-in velocity of the exhaust gas flowing into the adsorption means 5 can be uniformly controlled by means of the rectifying plate 35 provided on the upstream side of the adsorption means 5. As a result, the entire body of the adsorption means can be effectively utilized for adsorbing HC, thus remarkably improving the adsorbing efficiency.

When desorbing HC, the rectifying plate 35 prevents vortexes from occurring on the upstream side of the adsorption means 5. Therefore, the once-adsorbed HC can be prevented from flowing toward the exhaust gas flow path 34, thus further improving the exhaust gas purifying effect.

A recirculation flow pipe 6a branches from the exhaust pipe 3 at a position in the vicinity of the downstream end of the adsorption means 5 as well as on the upstream side of the change-over valve 8. The flow pipe 6a is connected to a recirculation flow pipe 6b communicated with the exhaust manifold 31 through a reed valve 7. The reed valve 7 serves as flow controlling means which controls the exhaust gas to flow through the flow pipes 6a and 6b in a predetermined direction, that is, in only one direction from the downstream end of the adsorption means 5 toward the exhaust manifold 31. The reed-valve 7 comprises a one-way valve 7a and a shut-off valve 7b to be described below. Lengths of the recirculation flow pipes 7b and 6b are individually set in such a manner that an average of a phase difference between pulsations of the exhaust gas applied to back and front surfaces of the one-way valve 7a inverts at 180 (deg) or by half-wave length when the automobile runs in a typical running pattern (for example, 75FTP mode in the United States).

A condition under which the average of the phase difference between the exhaust gas pulsations applied to the back and front surfaces of the one-way valve 7a inverts by the half-wave length, will be described concretely. In order to realize such a condition, it is necessary to select a ratio between a distance from the exhaust manifold 31 to the rear side of the one-way valve 7a via the recirculation flow pipe 6b and a distance from the exhaust manifold 31 to the front side of the one-way valve 7a via the exhaust pipe 3, the adsorption tube 50 and the recirculation flow pipe 6a.

Thus, since the one-way valve 7a is adapted to operate by the differential pressure between the exhaust gas pulsations from the upstream side of the catalyst unit 4 and from the adsorption means 5, the flow rate of the exhaust gas through the recirculation flow pipes 6a and 6b can be effectively increased. As a result, the desorbed HC can rapidly flow to the upstream side of the catalyst of the exhaust pipe 3 through the recirculation flow pipe 6a and 6b, so that the desorbed HC can be purified by the catalyst unit 4 speedily.

The adsorption tube 50 is provided with the actuator 9 for driving the change-over valve 8. The change-over valve 8 is connected to the actuator 9 through the shaft 91. In the illustrated embodiment, the actuator 9 includes a diaphragm 92 and a spring 93. The actuator 9 is communicated with an intake manifold 2 of the engine 1 through inlet pipes 10a and 10b through which a negative pressure is supplied to actuate the diaphragm 92. An electromagnetic valve 11 is interposed between the inlet pipes 10a and 10b.

The one-way valve 7a of the reed valve 7 is actuated by a differential pressure of the exhaust gas pulsation between the upstream side of the catalyst unit 4 and the downstream side of the adsorption means 5, and it permits a fluid to flow only from the recirculation flow pipe 6a to the recirculation flow pipe 6b. The shut-off valve 7b is actuated by a diaphragm or the like which is actuated by a negative pressure. The shut-off valve 7b is communicated with the inlet pipe 10b through which the electromagnetic valve 11 is connected to the intake manifold 2, via inlet pipes 12a and 12b for supplying the negative pressure to the shut-off valve 7b. An electromagnetic valve 13 is provided to be interposed between the inlet pipes 12a and 12b.

Reference numeral 14 denotes a control unit (control means) incorporated in a microcomputer. The control unit 14 receives signals from the engine 1 and an exhaust gas temperature sensor 15 to controllably open/close the electromagnetic valves 11 and 13 depending upon an operating state of the engine 1, thereby controlling the change-over valve 8 and the shut-off valve 7b.

Figure 3:
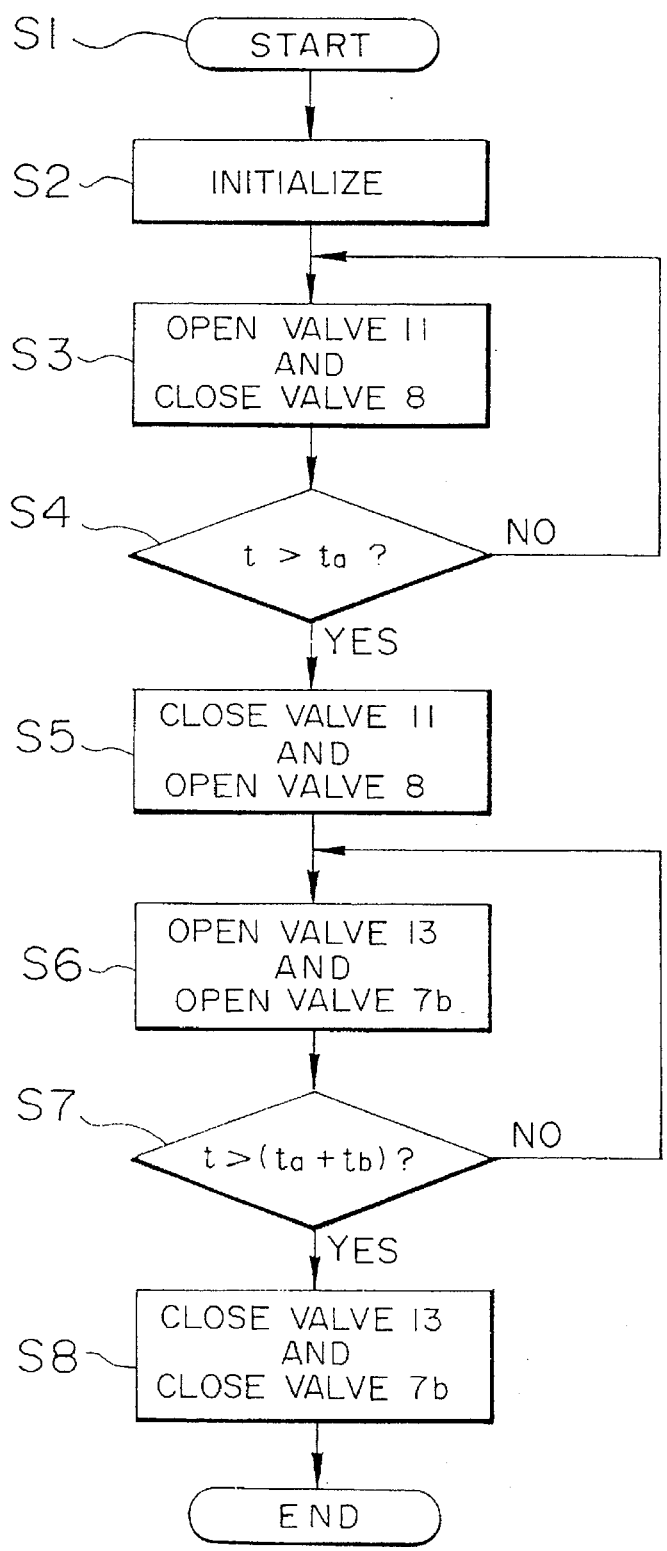
FIG. 3 is a flowchart showing the operation of the first embodiment.

Next, the operation of the apparatus according to this embodiment having the above-described structure will be described. FIG. 3 is a flowchart for explanation of the operation of the apparatus. When an ignition switch of the engine is turned on to start the engine 1, the microcomputer of the control unit 14 starts (S1) to perform an initializing process (S2). Thereafter, the electromagnetic valve 11 is opened by the control unit 14 at S3 to communicate the inlet pipes 10a and 10b with each other.

Consequently, the negative pressure in the intake manifold 2 is applied to the diaphragm 92 of the actuator 9 through the inlet pipes 10a and 10b to pull the shaft 91 upwardly. As a result, the change-over valve 8 rotates in a clockwise direction to occupy a close position shown by a dotted line, so as to close the exhaust gas flow path 34 and open the flow path 5d of the adsorption means 5.

An exhaust gas is at a low temperature just after the start of the engine 1 and the engine 1 discharges the exhaust gas containing a lot of cold HC. Since the catalyst does not reach an activating temperature while the exhaust gas is low in temperature, the cold HC is little purified by the catalyst unit 4 and flows into the exhaust pipe 3. At this time, the temperature of the exhaust gas is monitored by the exhaust gas temperature sensor 15.

The exhaust gas does not flow through the exhaust gas flow path (main flow path) 34 but it flows through the flow path 5d of the adsorption means 5 because the change-over valve 5 closes the exhaust gas flow path 34. At that time, the exhaust gas passes at first through a layer 5c which does not carry zeolite and then flows through the adsorbent carrying layer 5a which carries zeolite, where the cold HC is adsorbed by the adsorbent.

As mentioned above, the exhaust gas purification apparatus of the present invention can prevent the emission of HC while the engine is in a cold state before the catalyst unit 4 reaches the activating temperature. Further, the adsorbent can effectively adsorb HC and the HC can be effectively desorbed from the adsorbent and purified, and an adverse effect on the control of the engine caused by the purification of the HC can be minimized as far as possible.

The exhaust gas from which the cold HC is removed is discharged to the atmosphere through a muffler (not shown). At this time, since the rectifying plate 35 rectifies the flow of the exhaust gas, the exhaust gas flows into the adsorption means 5 in the uniform flow velocity distribution, so that the cold HC is uniformly adsorbed by the entire body of the honeycomb carrier of the adsorption means 5, thereby improving the adsorbing efficiency.

Figure 5A:
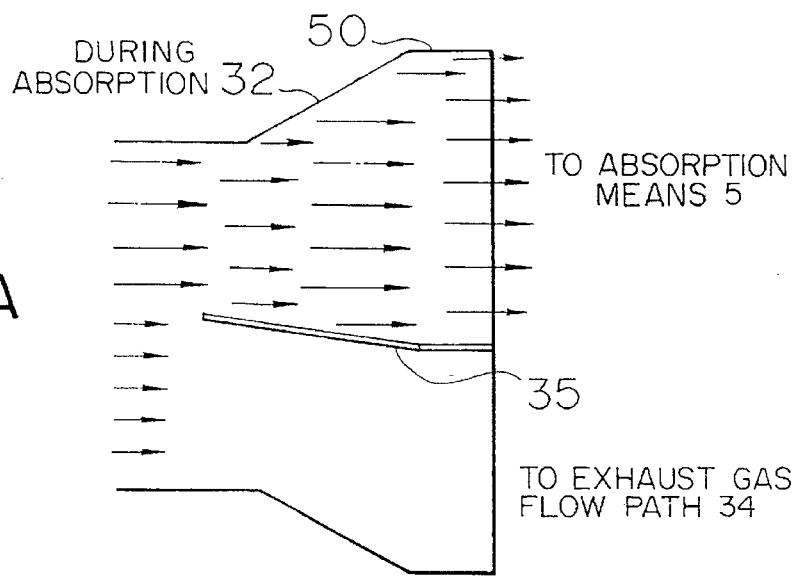
FIGS. 5A and 5B are explanatory views showing flowing states of the exhaust gas in the apparatus of the first embodiment.

FIG. 5A illustrates a flowing state of the exhaust gas during adsorption of HC, in which the flow velocity distribution of the exhaust gas flowing into the adsorption means 5 is made uniform by the function of the rectifying plate 35.

Upon the lapse of a predetermined period of time (ta), during which the engine 1 is warmed up and the temperature of the exhaust gas exceeds the temperature enabling the adsorbent to adsorb HC (t>ta), the judgement at S4 in FIG. 3 is YES and the operation shifts to S5, where the electromagnetic valve 11 is closed in response to a signal from the control unit 14. Thus, the supply of the negative pressure to the actuator 9 is shut off, so that the actuator 9 presses the shaft 91 downwardly by elastic force of the spring 93 contained in the actuator 9.

As the shaft 91 moves downwardly, the changeover valve 8 rotates in a counterclockwise direction to occupy an open position shown by a solid line, thereby opening the exhaust gas flow path (main flow path) 34. Thus, a course of flowing the exhaust gas is changed over to permit the exhaust gas to pass through the exhaust gas flow path 34 where the adsorption means 5 does not exist. At this time, the catalyst reaches the activating temperature, so that the HC in the exhaust gas is purified by the catalyst unit 4 and the exhaust gas containing little HC is discharged to the atmosphere through the exhaust gas flow path 34.

Immediately after the electromagnetic valve 11 is closed, the electromagnetic valve 13 is opened in response to a signal from the control unit 14 at S6. Thus, the inlet pipe 10b is communicated with the inlet pipe 12a and the negative pressure is supplied from the intake manifold 2 of the engine 1 to the shut-off valve 7b to open the same.

On the other hand, the exhaust gas which has risen in temperature flows through the exhaust gas flow path 34 adjacent to the adsorption means 5. The high-temperature exhaust gas contacts with the adsorbent carrying layer 5a of the adsorption means 5 through the bore 33a of the partition wall 33. Consequently, the heat of the exhaust gas is preferably conducted to the adsorbent carrying layer 5a, so that the temperature of the adsorbent rises rapidly to thereby promote the desorption of the HC.

Figure 4A:
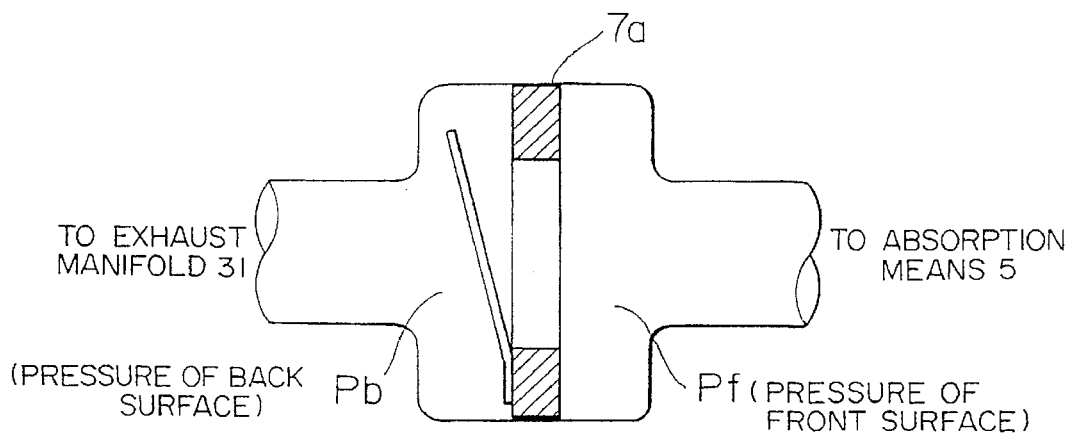
FIGS. 4A, 4B and 4C are explanatory views of pulsation of an exhaust gas applied to a one-way valve used in the apparatus according to the first embodiment.

At this time, since the shut-off valve 7b is opened as described above, the pulsation pressure of the exhaust gas produced in the exhaust manifold 31 is applied to the back surface of the one-way valve 7a through the circulation flow pipe 6b. Further, the pulsation pressure of the exhaust gas produced on the downstream side of the adsorption means 5 is applied to the front surface of the one-way valve 7a through the recirculation flow pipe 6a. The one-way valve 7a is thus opened intermittently (see FIG. 4A).

Figure 4B:
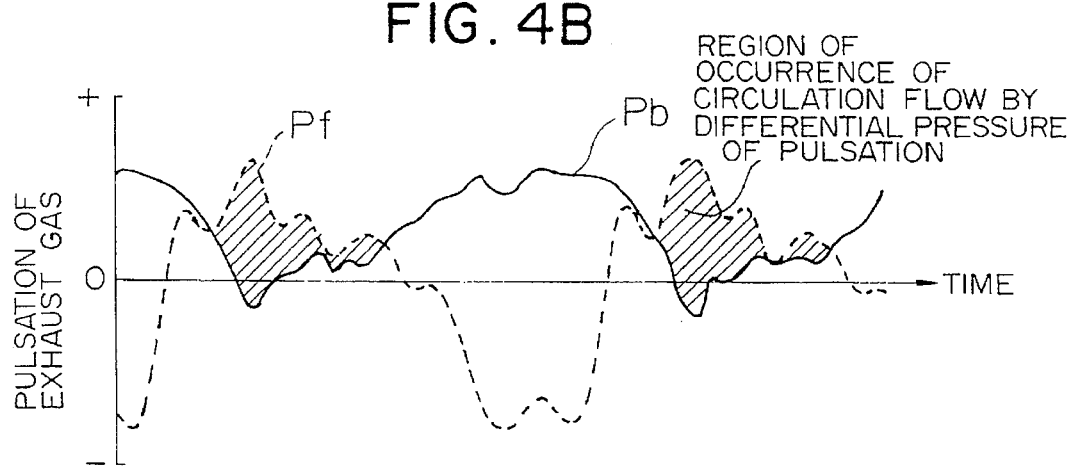
Figure 4C:
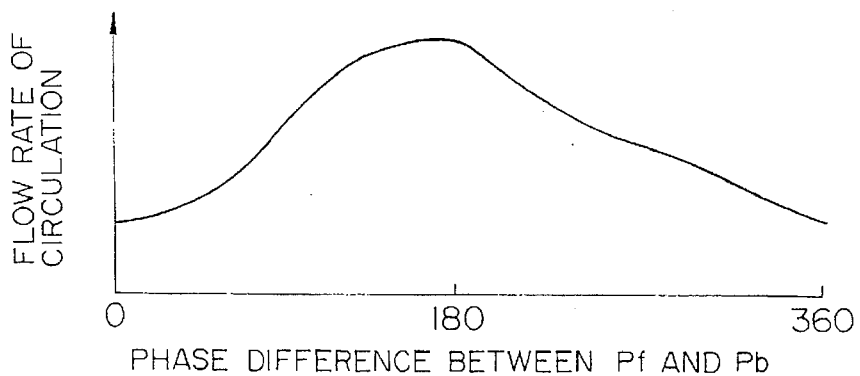

The exhaust gas pulsation pressures are predetermined such that, as shown in FIG. 4B, the phases of the pressure of the front surface Pf and the pressure of the back surface Pb invert with respect to each other at 180 (deg) or by the half-wave length. Consequently, the differential pressure between both the surfaces across the valve becomes large so that the flow rate of recirculation can be increased while the one-way valve 7a is intermittently opened. FIG. 4C shows the flow rate of recirculation with respect to the phase difference. It is understood from FIG. 4C that the recirculation flow rate is maximum when the phase difference is 180 (deg). This phase difference is determined depending on a ratio between the lengths of the recirculation flow pipes 6a and 6b. The one-way valve 7a is interposed between the recirculation flow pipes 6a and 6b. In other words, the recirculation flow rate is determined depending on the position where the one-way valve 7a is located.

Accordingly, the HC desorbed from the adsorbent of the adsorbent carrying layer 5a of the adsorption means 5 rapidly flows into the exhaust manifold 31 through the recirculation flow pipes 6a and 6b. Then, the desorbed HC is purified by the catalyst unit 4 together with the HC in the exhaust gas from the engine 1.

Figure 5B:
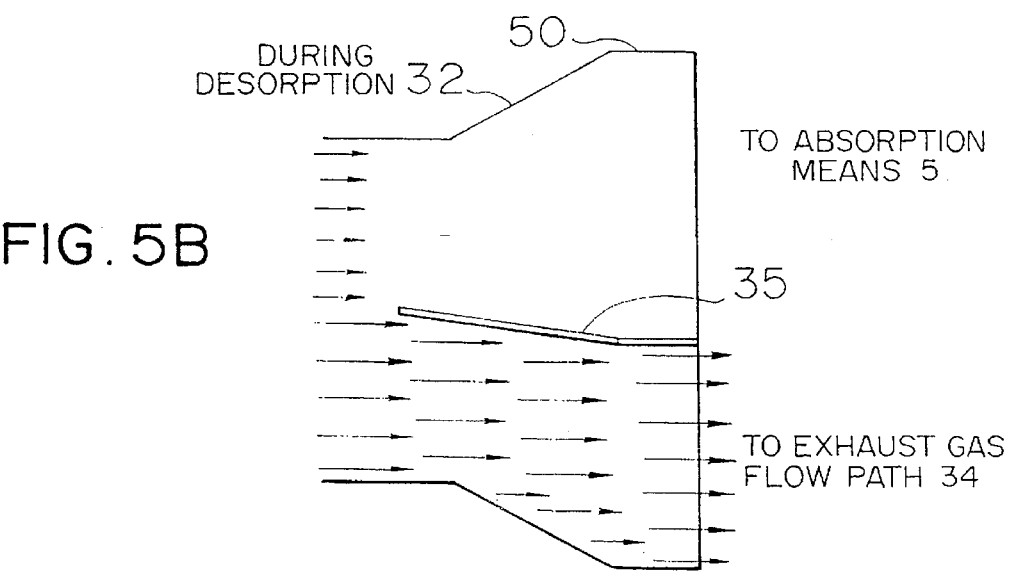

As mentioned above, when desorbing the HC, the exhaust gas hardly flows toward the upstream side of the adsorption means 5 as illustrated in FIG. 5B, so that the HC once adsorbed is not taken out of the adsorption means 5 to the upstream side thereof. Further, in this embodiment, the adsorbent-free layer 5c formed on the upstream side of the adsorption means 5, surely prevents the HC from flowing out of the adsorption means 5 toward the exhaust gas flow path 34.

Figure 5C:
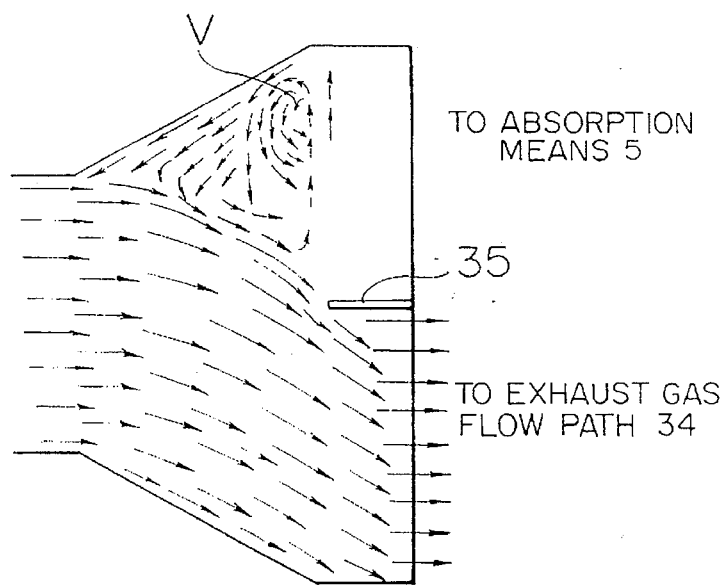
FIG. 5C is an explanatory view showing a flowing state of the exhaust gas when a rectifying plate is removed from the apparatus of the first embodiment.

Incidentally, as a result of experiments and investigations by the inventors of the present invention, it has become apparent that when the rectifying plate 35 is not provided, vortexes V of the exhaust gas occur on the upstream side of the adsorption means 5 during desorption of the HC, as shown in FIG. 5C, so that the adsorbed HC is taken out of the adsorption means 5 toward the exhaust gas flow path 34 by the vortexes V, which adversely affects the HC purifying efficiency.

When a period of time (tb) has elapsed [t>(ta+tb)], during which the change-over valve 8 is turned to the open position (shown by the solid line) and the HC desorption/purification process is started and then the desorption of the HC is completed, the judgement at S7 is YES and the operation proceeds to S8, where the electromagnetic valve 13 and the shut-off valve 7b are closed in response to a signal from the control unit 14.

The point of time at which the change-over valve 8 is applied to the HC desorption/purification process (position shown by the solid line) by closing the electromagnetic valve 11 in response to the signal from the control unit, is after the certain period of time has elapsed from the start of the engine. Otherwise, the timing of the valve change-over process may be set depending on a fact the temperature of the exhaust gas reaches a predetermined high temperature without judging whether or not the certain period of time has elapsed.

Further, in the illustrated embodiment, the reed valve 7 includes the one-way valve 7a and the shut-off valve 7b in combination, but the reed valve 7 may comprise only the one-way valve 7a.

Then, in the exhaust gas purification apparatus of this embodiment, the emission of cold HC to the atmosphere can be prevented by adsorbing the cold HC through the adsorption means 5 when the engine is in a cold state before the catalyst reaches an activating temperature. In the apparatus, particularly, since the main exhaust gas flow path 34 and the adsorbent carrying layer 5a in which the cold HC is adsorbed by the adsorbent are formed separately from each other in such a manner that the exhaust gas is brought into direct contact with the adsorbent carrying layer 5a, the adsorbent is heated by the exhaust gas at a high temperature in the HC desorption/purification process. Also, when the adsorbed HC is being desorbed, the one-way valve 7a is intermittently opened by the pulsation pressures of the exhaust gas applied to the front and back surfaces of the one-way valve 7a so as to return the desorbed HC to the upstream side of the catalyst unit 4 through the circulation flow pipes 6a and 6b to thereby permit the HC to be effectively desorbed and purified. Further, since the desorbed HC is returned to the exhaust pipe 3 on the upstream side of the catalyst unit 4, the adverse effect on the control of the engine caused by the return of the HC can be reduced.

Figure 6A:
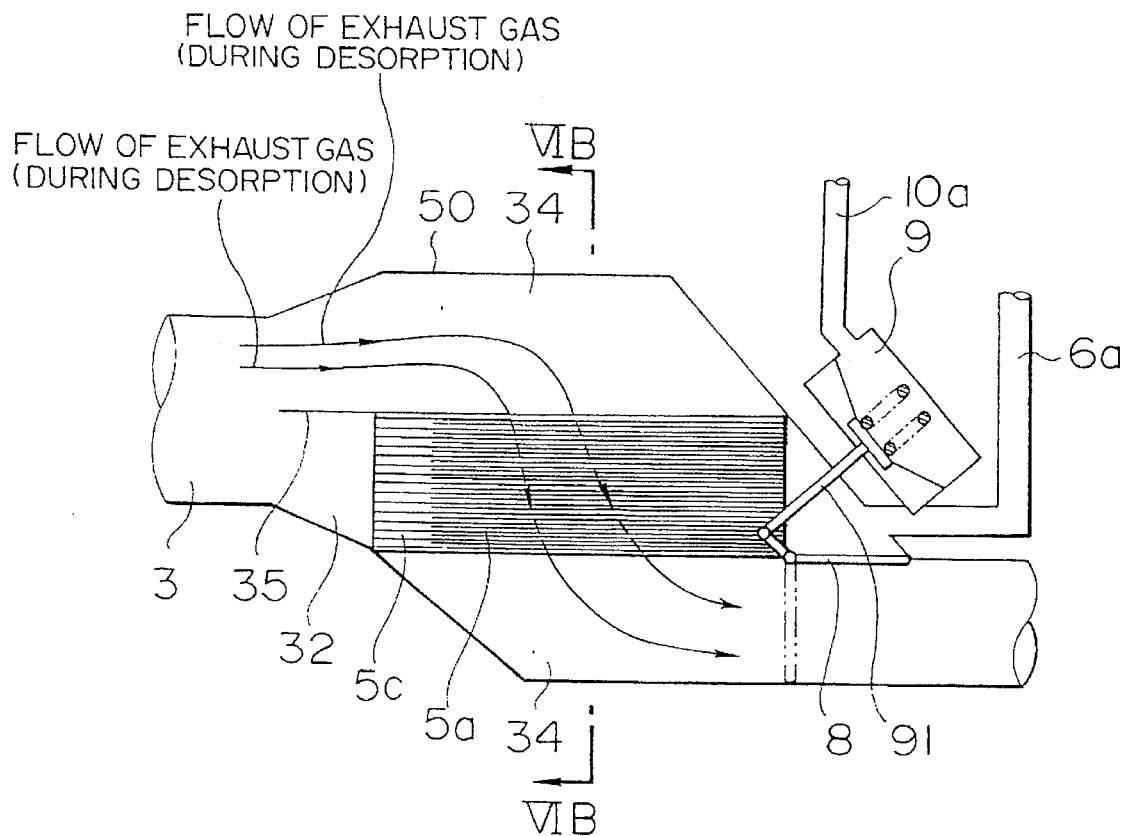
FIGS. 6A and 6B are views for explanation of a second embodiment of the invention.
Figure 6B:
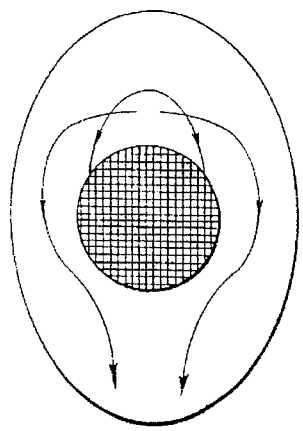

FIGS. 6A and 6B are views showing an arrangement of a second embodiment of the present invention.

FIG. 6B is a cross-sectional view taken along a line VIB—VIB of FIG. 6A.

In the second embodiment, adsorption means or a honeycomb member 5 is located at a center of an adsorption tube 50. An exhaust gas is adapted to flow through a space around the outer periphery of the honeycomb member.

The operation of the second embodiment is similar to that of the first embodiment.

A different point of this embodiment from the first embodiment resides in a flow of the exhaust gas with respect to the honeycomb member 5.

More specifically, in the second embodiment, the desorption of HC is more promoted during desorption/purification of HC than the first embodiment because the high-temperature exhaust gas contacts with the entire outer peripheral surface of an adsorbent carrying layer 5a. The second embodiment is advantageous in that a series of control can be completed in a shorter period of time than the first embodiment.

Additionally, the honeycomb member 5 is not always required to be positioned at the center, but it may be positioned eccentrically.

Figure 7A:
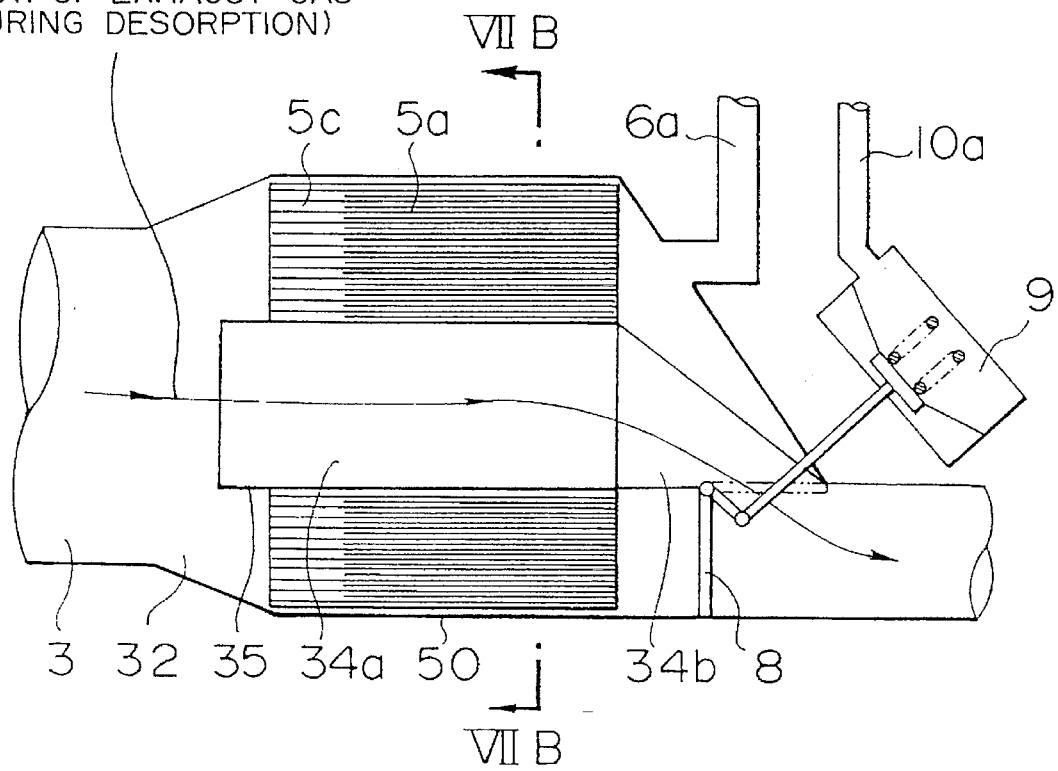
FIGS. 7A and 7B are views for explanation of a third embodiment of the invention.
Figure 7B:
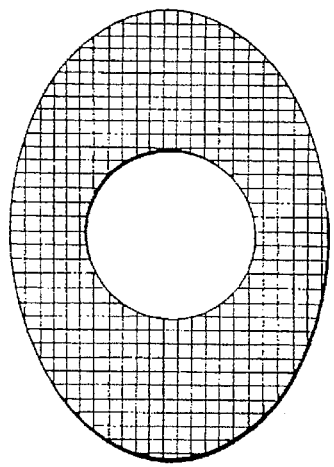

FIGS. 7A and 7B are views showing the arrangement of a third embodiment of the present invention.

FIG. 7B is a cross-sectional view taken along a line VIIB—VIIB of FIG. 7A.

In this embodiment, a flow path 34a is formed as a through hole extending at a center of an adsorption tube 50, through which an exhaust gas is adapted to flow. Additionally, the flow path 34a is not always necessary to extend at the center of the adsorption tube, but it may be positioned eccentrically.

The operation of the third embodiment is similar to that of the first embodiment.

This embodiment is advantageous in that the desorption of HC is more promoted and a series of control can be completed in a shorter period of time than the first embodiment because the high-temperature exhaust gas contacts with the entire inner peripheral surface of an adsorbent carrying layer 5a during desorption/purification of HC. Further, it is unnecessary to form another flow path so that the apparatus can be made compact.

Figure 8:
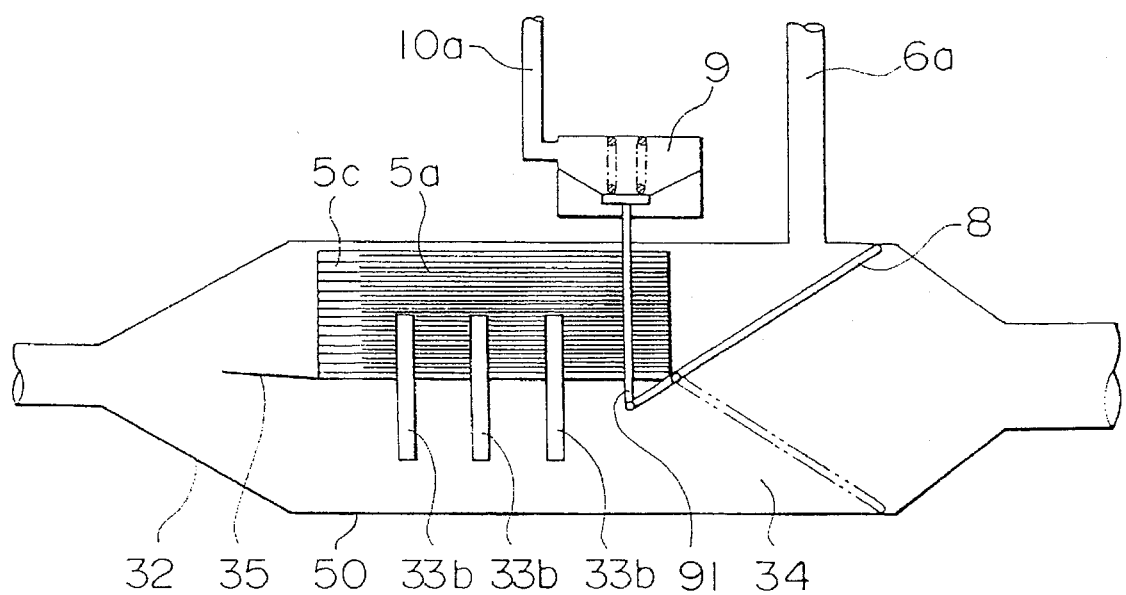
FIG. 8 is a view showing an arrangement of an apparatus according to a fourth embodiment of the invention.

FIG. 8 is a view showing an arrangement of a fourth embodiment of the present invention.

In the fourth embodiment, fins 33b made of, for example, stainless steel are provided to extend from an adsorbent carrying layer 5a into a flow path 34.

The operation of the fourth embodiment is similar to that of the first embodiment.

This embodiment is advantageous in that the desorption of HC is more promoted and a series of control can be completed in a shorter period of time than the first embodiment because the high-temperature exhaust gas contacts with the fins 33b extended from the adsorbent carrying layer 5a during desorption/purification of HC.

In the illustrated embodiment, the fins 33b are not always necessary to extend vertically, but they may extend slantingly.

A fifth embodiment of the present invention will now be described with reference to FIG. 9. An essential structure of the fifth embodiment is similar to that of the first embodiment. In this embodiment, however, a pipe port or Joint portion between a recirculation flow pipe 6b and an exhaust manifold 31 is located on the upstream side of a converging portion of the exhaust manifold 31 or at an exhaust port portion 31a of an engine 1. This is aimed at effectively utilizing a fact that the pulsation of an exhaust gas at the exhaust port portion is larger than those at the converging portion of the exhaust manifold 31 and a straight portion of the exhaust pipe 3. Accordingly, a negative pressure component of the exhaust gas pulsation applied to a one-way valve or flow controlling means 7a becomes larger, so that the flow rate of recirculation also becomes larger to thereby recirculate and purify desorbed HC rapidly.

Figure 10A:
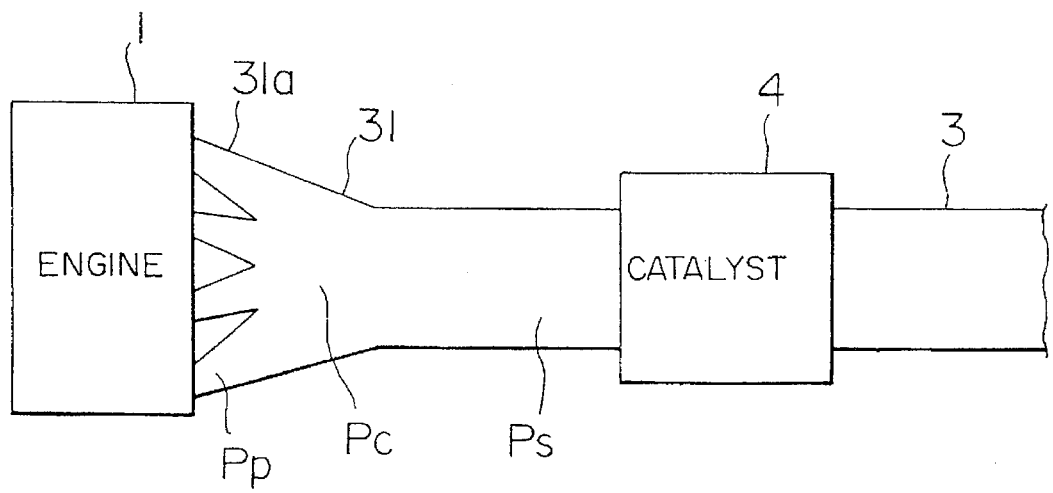
FIGS. 10A and 10B are views for explanation of one example of pulsation of the exhaust gas applied to a one-way valve used in the apparatus of the fifth embodiment.
Figure 10B:
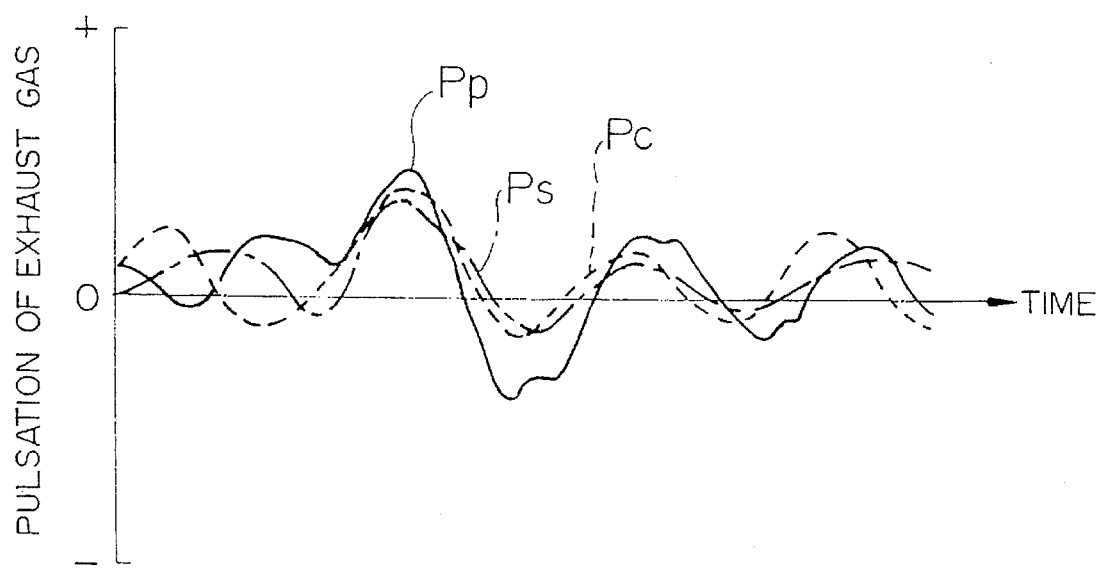

FIG. 10B is a graph showing a relation between the exhaust gas pulsation and time, representative of the magnitude of the exhaust gas pulsation with respect to respective portions, in which Pp indicates the exhaust gas pulsation at the exhaust port portion 31a of the engine 1, Pc indicates the exhaust gas pulsation at the converging portion of the exhaust manifold 31, and Ps indicates the exhaust gas pulsation at the straight portion of the exhaust pipe 3. As clearly be understood from FIG. 10B, the exhaust gas pulsation Pp at the exhaust port portion 31a of the engine 1 is the largest. According to the fifth embodiment, the negative pressure component of the exhaust gas pulsation applied to the back surface of the one-way valve 7a can be made larger by effectively utilizing the exhaust gas pulsation Pp. Therefore, the flow rate of recirculation can be increased so as to recirculate and purify the desorbed HC promptly.

Figure 11:
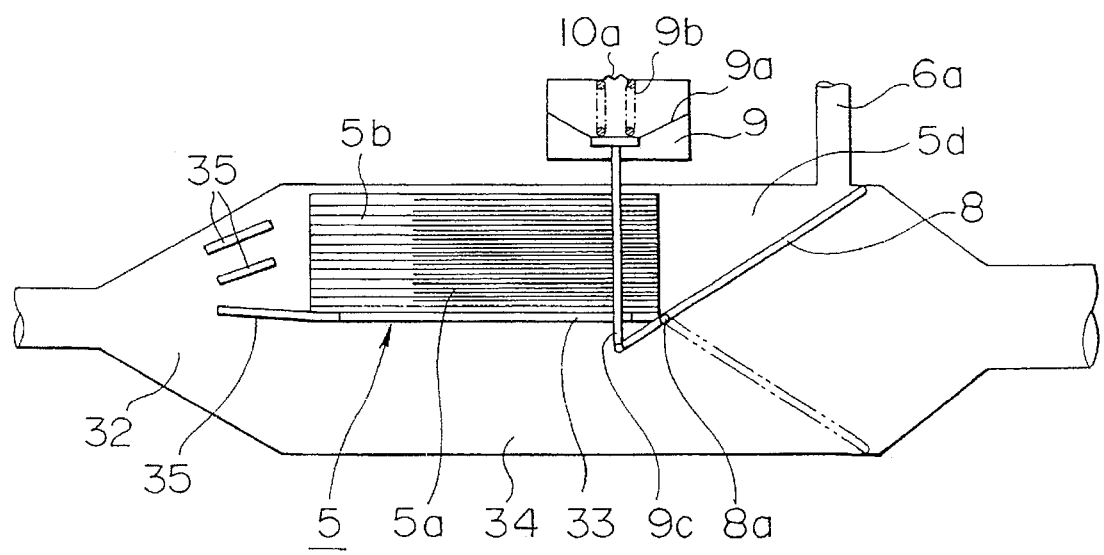
FIG. 11 is a view showing an arrangement of an essential portion of an apparatus according to a sixth embodiment of the invention.

According to a sixth embodiment of the present invention, as shown in FIG. 11, a plurality of rectifying plates 35 having planar surfaces (three in the illustrated embodiment) are provided on the upstream side of an adsorption means 5. The plurality of rectifying plates 35 are arranged at certain intervals in such a manner that they extend in parallel relation with the flow of an exhaust gas. More specifically, the plurality of the rectifying plate 35 are mounted in a manner to be inclined toward a direction of a diverging angle of the enlarged-diameter portion 32 as they approach the inner peripheral surface of the enlarged-diameter portion 32. The middle rectifying plate is inclinedly mounted at an angle larger than that of the lowermost one.

By arranging the plurality of rectifying plates 35 in the manner described above, the flow velocity distribution of the exhaust gas which flows into the adsorption means 5 can be made more uniform while adsorbing HC.

Figure 12:
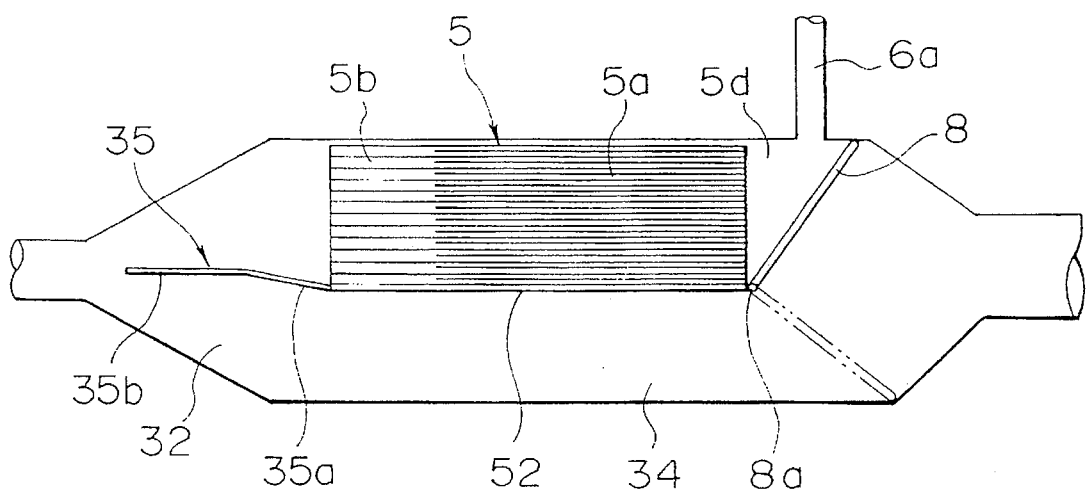
FIG. 12 is a view showing an arrangement of an essential portion of an apparatus according to a seventh embodiment of the invention.
Figure 13:
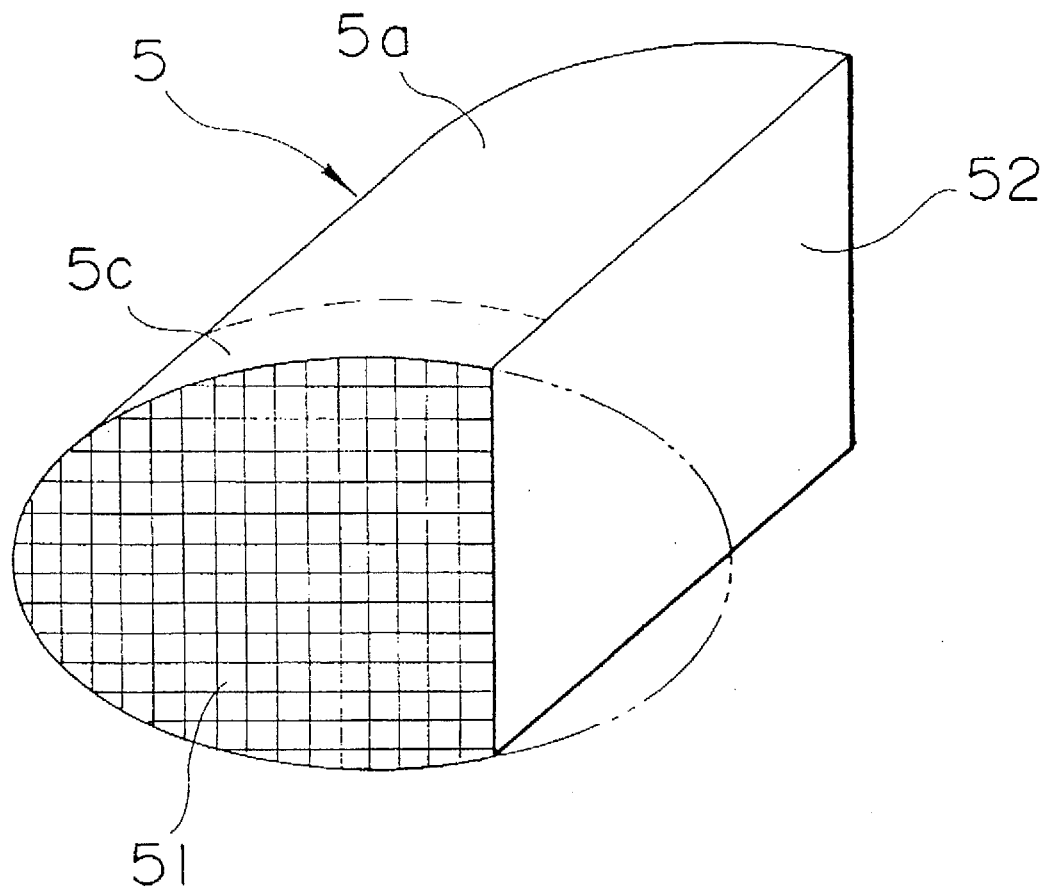
FIG. 13 is a perspective view of adsorption means used in the apparatus of the seventh embodiment of the invention.

As shown in FIGS. 12 and 13, according to a seventh embodiment of the present invention, used as absorption means 5 is a honeycomb member in the shape of a semi-elliptic cylinder like a shape which may be obtained by substantially dividing an elliptic cylinder into two portions. A rectifying plate 35 is provided such that it extends from an upstream end of a flat face 52 of the honeycomb member toward the upstream side of the adsorption means. This rectifying plate 35 comprises a slant portion 35a slightly inclined upwardly with respect to the flat face 52 of the honeycomb member and a parallel portion 35b extending in parallel relation with the flat face 52 from an edge of the slant portion 35a.

The present invention is not limited to the above-described embodiment shown in the drawings, but can be modified in various ways. For example, the present invention can be applied to a type in which the recirculation flow pipes 6a and 6b are connected not to the exhaust pipe at the location just upstream of the catalyst unit 4, but to the intake manifold 2 of the engine 1.

FIGS. 14 to 17 show an eighth embodiment of the present invention which differs from the first embodiment in the structure for supporting absorption means or a honeycomb member 5 with respect to an enlarged-diameter portion 32.

Supporting members 301 and 302 made of an elastic gastight material are provided to extend over the whole peripheries of front and rear ends of the honeycomb member 5. The supporting member 301 is not provided at a position where the honeycomb member is exposed to the associated flow path so that the supporting member 301 does not lap over a bore 33a. Thus, a harmful component can be efficiently desorbed from an adsorbent. The honeycomb member 5 is held between the enlarged-diameter portion 32 and a partition wall 33 by means of the supporting member 301. Accordingly, an exhaust gas does not flow into the flow path 34 through a gap between the partition wall 33 and the honeycomb member 5. Therefore, when adsorbing the harmful component as well as when desorbing the harmful component from the honeycomb member, the honeycomb member 5 can efficiently adsorb and desorb the harmful component without leakage of the harmful component into the exhaust pipe from the honeycomb member.

Figure 16A:
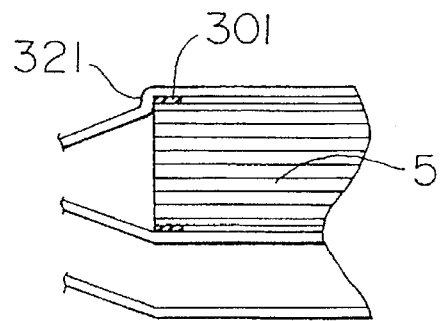
FIGS. 16A and 16B are enlarged views of a front end portion of the honeycomb member used in the eighth embodiment.
Figure 16B:
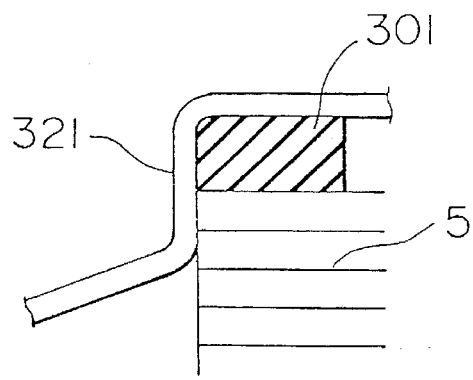

Further, as shown in FIGS. 16A and 16B, the enlarged-diameter portion 32 includes a step 321 formed at a portion where it abuts against the front end of the honeycomb member 5. The step 321 prevents the honeycomb member 5 from moving toward the upstream side of the exhaust pipe by external vibrations from the engine or the like.

In the eighth embodiment, the honeycomb member 5 is prevented from moving toward the upstream side of the exhaust pipe by the step 321 formed on the enlarged-diameter portion on the upstream side of the honeycomb member 5. Alternatively, even when a stopper plate, stopper pin or the like is provided on the enlarged-diameter portion 32, a similar effect can be obtained.

Figure 17:
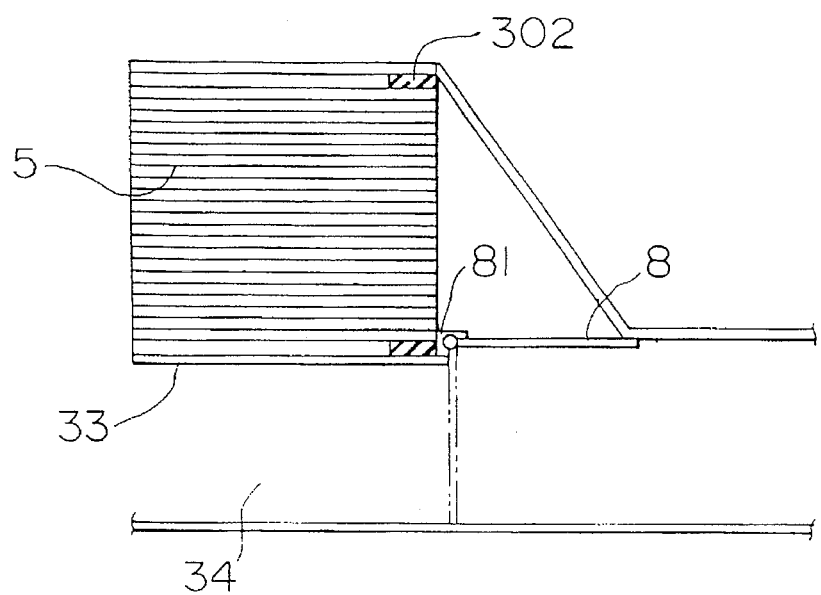
FIG. 17 is an enlarged view of a rear end portion of the honeycomb member used in the eighth embodiment.

Further, as shown in FIG. 17, the rear end of the honeycomb member 5 abuts against a shaft casing 81 serving as a shaft of an exhaust-gas-flow-path change-over valve 8, which shaft casing 81 is attached to the partition wall 33.

Due to the abutment between the honeycomb member 5 and the shaft casing 81, the shaft casing also acts as a stopper for preventing the honeycomb member 5 from moving toward the downstream side of the exhaust pipe even when the honeycomb member 5 receives external vibrations from the engine or the like.

In order to prevent the honeycomb member 5 from moving toward the downstream side of the exhaust pipe, a step as shown in FIGS. 16A and 16B may be provided on the enlarged-diameter portion, or a stopper plate, stopper pin or the like may be attached to the enlarged-diameter portion.

In the eighth embodiment, because the supporting members 301 and 302 are provided, HC desorbed from the honeycomb member 5 does not leak into the flow path 34 through the bore 33a of the partition wall 33. Further, since the supporting members 301, 302 are provided on the honeycomb member 5 so as not to cover the bore 33a, the heat of the exhaust gas can be preferably conducted to an adsorbent carrying layer 5a through the bore 33a.

Thus, in the exhaust gas purification apparatus of this embodiment, the emission of cold HC can be prevented even when the engine is in a cold state before the catalyst reaches an activating temperature. In the apparatus, particularly, since the adsorbent carrying layer 5a in which the cold HC is adsorbed by the adsorbent and the main exhaust gas flow path 34 are formed separately from each other in such a manner that the exhaust gas directly contact with the adsorbent carrying layer 5a, the adsorbent is heated by the exhaust gas at a high temperature in the HC desorption/purification process to permit the HC to be effectively desorbed and purified.

Figure 18A:
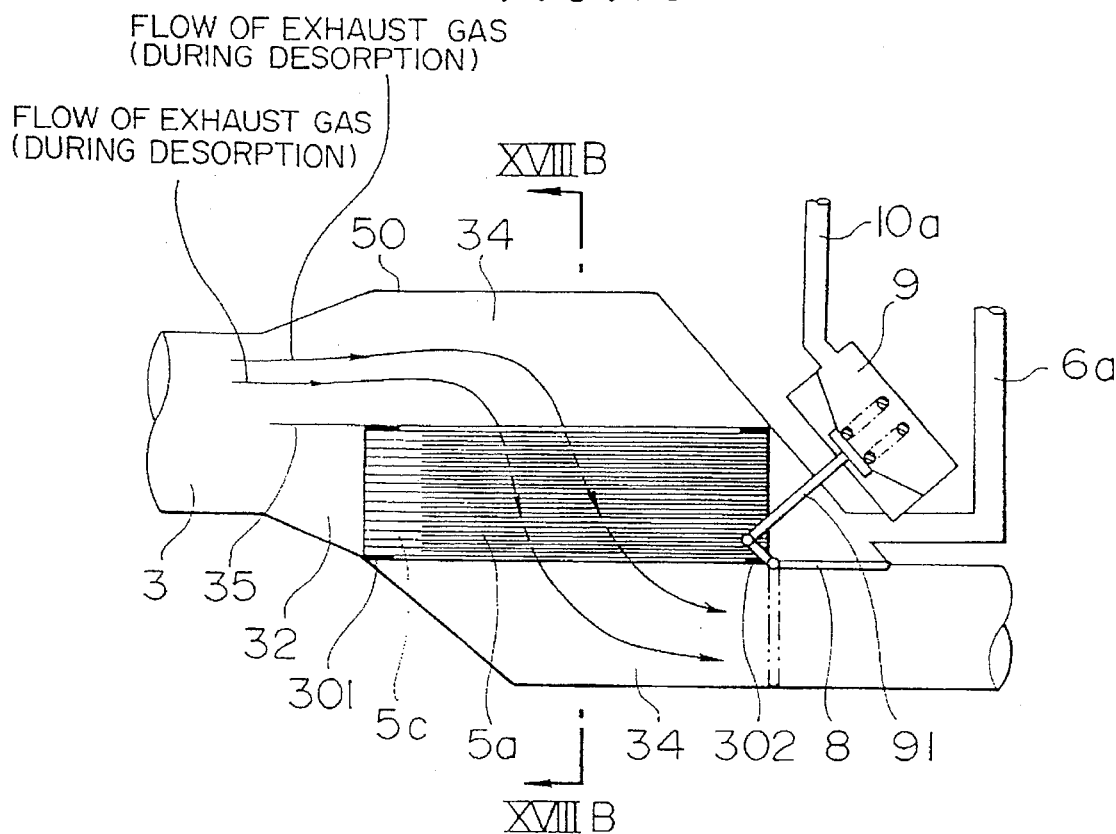
FIGS. 18A and 18B are views showing an arrangement of an apparatus according to a ninth embodiment of the invention.
Figure 18B:
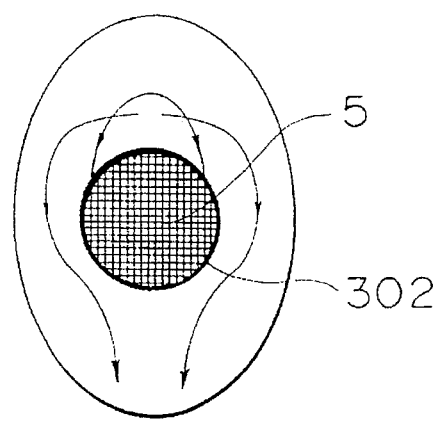

FIGS. 18A and 18B are views showing the arrangement of a ninth embodiment of the present invention.

FIG. 18B is a cross-sectional view taken along a line XVIIIB—XVIIIB of FIG. 18A.

In the illustrated embodiment, a honeycomb member 5 is provided to extend at a center of an adsorption tube 50. An exhaust gas is adapted to flow through a space around an outer periphery of the honeycomb member.

The operation of this embodiment is similar to that of the eighth embodiment.

A different point of the ninth embodiment from the eighth embodiment resides in the flow of the exhaust gas with respect to the honeycomb member 5.

More specifically, since the high-temperature exhaust gas contacts with the entire outer peripheral surface of an adsorbent carrying layer 5a during desorption/purification of HC, the ninth embodiment is advantageous in that the desorption is more promoted and a series of control can be completed in a shorter period of time than the eighth embodiment.

In addition, the honeycomb member 5 is not always necessary to extend at the center of the adsorption tube, but it may be positioned eccentrically.

Figure 19A:
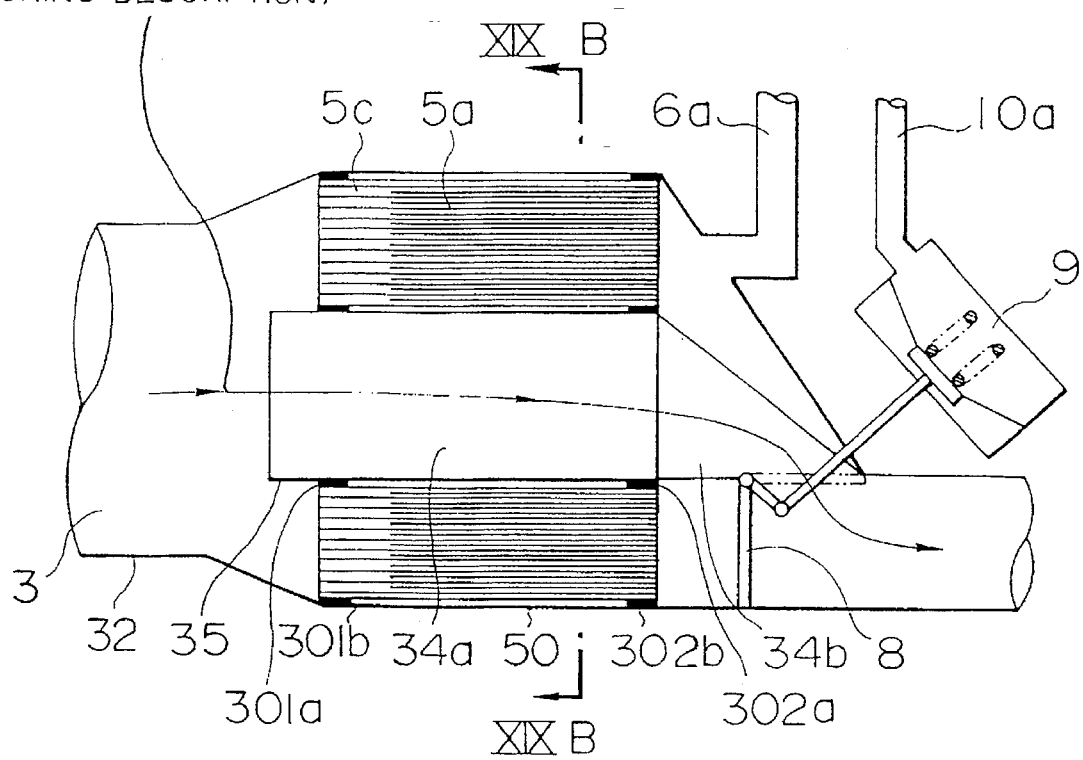
FIGS. 19A and 19B are views showing the arrangement of an apparatus according to a tenth embodiment of the invention.
Figure 19B:
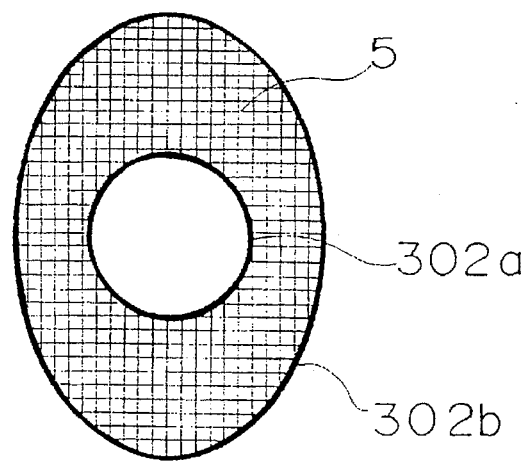

FIGS. 19A and 19B are views showing an arrangement of a tenth embodiment of the present invention.

FIG. 19B is a cross-sectional view taken along a line IXXB—IXXB of FIG. 19A.

In the illustrated embodiment, a flow path 34a is formed as a through hole provided at a center of an adsorption tube 50. An exhaust gas is adapted to flow through the flow path. It is not necessary that the flow path 34a be positioned at the center of the adsorption tube 50, but it may be positioned eccentrically.

The operation of this embodiment is similar to that of the eighth embodiment.

Since the high-temperature exhaust gas contacts with the entire inner peripheral surface of an adsorbent carrying layer 5a during desorption/purification of HC, the tenth embodiment is advantageous in that the desorption is more promoted and a series of control can be completed in a shorter period of time than the eighth embodiment. Further, it is unnecessary to form another flow path, so that the apparatus can be made compact.

Figure 20:
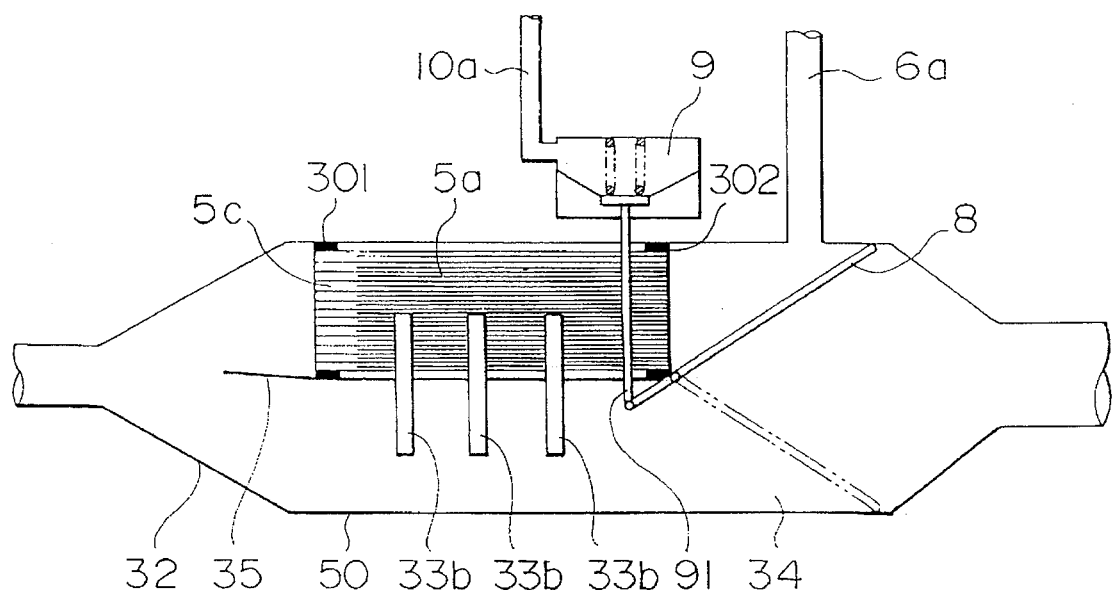
FIG. 20 is a view showing an arrangement of an apparatus according to an eleventh embodiment of the invention.

FIG. 20 is a view showing an arrangement of an eleventh embodiment of the present invention.

In the illustrated embodiment, fins 33b made of, for example, stainless steel are extended from an adsorbent carrying layer 5a to a flow path 34.

The operation of this embodiment is similar to that of the eighth embodiment.

Since the high-temperature exhaust gas contacts with the fins 33b extended from the adsorbent carrying layer 5a during desorption/purification of HC, the eleventh embodiment is advantageous in that the desorption is more promoted and a series of control can be completed in a shorter period of time than the eighth embodiment.

In the present invention, the fins 33b are not always provided to extend vertically, but they may be inclined.

What is claimed is:

1. An exhaust gas purification apparatus comprising:
   a catalyst unit provided in an exhaust pipe of an internal combustion engine;
   an adsorbent for adsorbing a harmful component of an exhaust gas of said internal combustion engine, said adsorbent being provided downstream of said catalyst unit:
   recirculation means for recirculating said harmful component of said exhaust gas adsorbed by said adsorbent to an upstream side of said catalyst unit; and
   change-over means for switching a course of flowing said exhaust gas of said internal combustion engine, so that said exhaust gas passes through said adsorbent where said harmful component of said exhaust gas is adsorbed when a temperature of said exhaust gas of said internal combustion engine is below a predetermined level, and that said exhaust gas does not pass through said adsorbent when the temperature of said exhaust gas of said internal combustion engine is above said predetermined level,
   wherein said adsorbent is exposed to said exhaust gas when said temperature of said exhaust gas of said internal combustion engine is above said predetermined level.

2. An exhaust gas purification apparatus according to claim 1, wherein said exhaust pipe of said internal combustion engine includes a first flow path and a second flow path separated by a partition wall having an opening portion formed therein, said adsorbent is provided in said first flow path, and at least a portion of a side surface of said adsorbent is exposed to said second flow path through said opening portion.

3. An exhaust gas purification apparatus according to claim 2, wherein there are provided supporting members made of a gastight material for securely holding said adsorbent with respect to said exhaust pipe and for preventing said exhaust gas from flowing in between said adsorbent and said exhaust pipe, said supporting members being provided to extend over whole peripheries of portions of said adsorbent where said adsorbent is not exposed to said second flow path.

4. An exhaust gas purification apparatus according to claim 1, wherein said change-over means is provided only downstream of said adsorbent.

5. An exhaust gas purification apparatus according to claim 1, wherein said recirculation means is provided with a one-way valve for controlling said harmful component of said exhaust gas to flow only toward said upstream side of said catalyst unit.

6. An exhaust gas purification apparatus according to claim 1, wherein an outer peripheral surface of said adsorbent is exposed to said exhaust gas of said internal combustion engine when said temperature of said exhaust gas of said internal combustion engine is above said predetermined level.

7. An exhaust gas purification apparatus according to claim 1, wherein a through hole is defined at a substantially central portion of said adsorbent, and said exhaust gas of said internal combustion engine passes through said through hole when said temperature of said exhaust gas of said internal combustion engine is above said predetermined level.

8. An exhaust gas purification apparatus according to claim 1, wherein said adsorbent includes a heat adsorbing means adapted to be exposed to said exhaust gas when said temperature of said exhaust gas of said internal combustion engine is above said predetermined level.

9. An exhaust gas purification apparatus comprising:
   a catalyst unit provided in an exhaust pipe of an engine;
   adsorption means which carries an adsorbent for adsorbing a harmful component of an exhaust gas, said adsorption means being provided in said exhaust pipe downstream of said catalyst unit;
   a first exhaust gas flow path for forming a flow of said exhaust gas which does not pass through said adsorption means, said first exhaust gas flow path being provided in said exhaust pipe downstream of said catalyst unit;
   recirculation flow pipes for connecting a second flow path of said adsorption means and an upstream side of said catalyst unit;
   flow controlling means provided between said recirculation flow pipes so as to be actuated by pulsations of said exhaust gas, said flow controlling means controlling a flow in said recirculation flow pipes only in one direction from said adsorption means to said catalyst unit;
   exhaust-gas-flow-path change-over means which can selectively change over a course of flowing said exhaust gas between said adsorption means and said first exhaust gas flow path; and
   control means for controllably turning said exhaust-gas-flow-path change-over means to a first position where said exhaust gas is made to flow through said adsorption means when an engine is in a cool state and to a second position where said exhaust gas is made to flow through said first exhaust gas flow path when said engine is in a warm state,
   wherein a position of said flow controlling means between said recirculation flow pipes is predetermined so that said flow controlling means is operated by a differential pressure by a phase difference between pulsations of said exhaust gas applied to said flow controlling means from said upstream side of said catalyst unit and applied to said flow-controlling means from said second flow path of said adsorption means.

10. An exhaust gas purification apparatus according to claim 9, wherein said position of said flow controlling means between said recirculation flow pipes is determined so that a phase difference between said pulsations of said exhaust gas applied to said flow controlling means from said upstream side of said catalyst unit and said pulsations of said exhaust gas applied to said flow controlling means from said second flow path of said adsorption means, inverts substantially by a half-wave length.

11. An exhaust gas purification apparatus according to claim 9, wherein said catalyst unit is located on a downstream side of an exhaust port converging portion of an exhaust manifold of said engine, and a port of said recirculation flow pipes is connected to an independent exhaust port upstream of said exhaust port converging portion of said exhaust manifold.

12. An exhaust gas purification apparatus according to claim 10, wherein said catalyst unit is located downstream of an exhaust port converging portion of an exhaust manifold of said engine, and a port of said recirculation flow pipes is connected to an independent exhaust port upstream of said exhaust port converging portion of said exhaust manifold.

13. An exhaust gas purification apparatus according to any one of claims 9 to 12, wherein said adsorption means is provided adjacent to said first exhaust gas flow path in parallel therewith in said exhaust pipe.

14. An exhaust gas purification apparatus according to any one of claims 9 to 12, wherein said exhaust-gas-flow-path change-over means is provided downstream of said adsorption means.

15. An exhaust gas purification apparatus according to any one of claims 9 to 12, wherein said adsorption means is provided adjacent to said first exhaust gas flow path in parallel therewith in said exhaust pipe, and said exhaust-gas-flow-path change-over means is provided downstream of said adsorption means.

16. An exhaust gas purification apparatus comprising:
a catalyst unit provided in an exhaust pipe of an engine;
adsorption means which carries an adsorbent for adsorbing a harmful component of an exhaust gas, said adsorption means being provided in said exhaust pipe downstream of said catalyst unit;
a first exhaust gas flow path for forming a flow of said exhaust gas which does not pass through said adsorption means, said first exhaust gas flow path being provided in said exhaust pipe downstream of said catalyst unit;
recirculation flow pipes for recirculating said harmful component of said exhaust gas adsorbed by said adsorption means to an upstream side of said catalyst unit;
exhaust-gas-flow-path change-over means provided downstream of said adsorption means, which means can selectively switch a course of flowing said exhaust gas between a second flow path of said adsorption means and said first exhaust gas flow path;
rectifying means provided upstream of said adsorption means, which means can rectify a flow of said exhaust gas flowing into said adsorption means to thereby uniformly distribute a flow-in velocity of said exhaust gas; and
control means for controllably turning said exhaust-gas-flow-path change-over means to a first position where said exhaust gas is made to flow through said adsorption means when said engine is in a cool state and to a second position where said exhaust gas is made to flow through said first exhaust gas flow path when said engine is in a warm state.

17. An exhaust gas purification apparatus according to claim 16, wherein:
said adsorption means comprises a honeycomb member in a substantially semi-cylindrical shape;
said honeycomb member is arranged in said exhaust pipe in such a manner that a flat surface of said semi-cylindrical shape thereof is directed toward a center of said exhaust pipe;
said first exhaust gas flow path is formed in said exhaust pipe adjacent to said flat surface of said honeycomb member; and
said rectifying means comprises a rectifying plate connected to an upstream end of said flat surface of said honeycomb member so as to further extend upstream from said upstream end.

18. An exhaust gas purification apparatus according to claim 16 or 17, wherein said rectifying means comprises a plurality of rectifying plates arranged at certain intervals substantially in parallel relation with a flow of said exhaust gas on an upstream side of said adsorption means.

19. An exhaust gas purification apparatus according to claim 16, wherein:
said adsorption means and said first exhaust gas flow path are provided in the same exhaust pipe adjacent to and in parallel with each other;
a partition wall is provided between said adsorption means and said first exhaust gas flow path; and
said rectifying means comprises a rectifying plate formed integrally with said partition wall.

20. An exhaust gas purification apparatus according to claim 16 or 19, wherein:
said adsorption means comprises a honeycomb member in a semi-elliptic cylindrical shape wherein said shape is similar to that which is obtained by substantially dividing an elliptic cylinder into two portions;
said honeycomb member is arranged in said exhaust pipe in such a manner that a flat surface of said semi-elliptic cylindrical shape thereof is directed toward a center of said exhaust pipe;
said first exhaust gas flow path is formed in said exhaust pipe adjacent to said flat surface of said honeycomb member;
said rectifying means comprises a rectifying plate connected to an upstream end of said flat surface of said honeycomb member so as to further extend upstream from said upstream end; and
said rectifying plate is bent at an intermediate portion upwardly with respect to said flat surface of said honeycomb member.

21. An exhaust gas purification apparatus comprising:
a catalyst provided in an exhaust pipe of an internal combustion engine;
a container provided downstream of said catalyst with an inlet and an outlet for an exhaust gas;
an adsorbent disposed in said container for adsorbing a harmful component contained in said exhaust gas of said internal combustion engine;
a lateral flow passage defined in said container and disposed laterally of said adsorbent for passing through said exhaust gas introduced into said container;
recirculation means for recirculating said harmful component adsorbed by said adsorbent to an upstream side of said catalyst; and
change-over means, disposed in said container, for switching a flow of said exhaust gas introduced into said container to a side of said adsorbent or to a side of said lateral flow passage, wherein said change-over means is set to switch said flow of said exhaust gas so as to cause said exhaust gas to pass through said adsorbent when a temperature of said exhaust gas of said internal combustion engine is lower than a predetermined level and to cause said exhaust gas to pass through said lateral flow passage and not to pass through said adsorbent when said temperature of said exhaust gas of said internal combustion engine is higher than said predetermined level, and said adsorbent is exposed to said exhaust gas passing through said lateral flow passage when said temperature of said exhaust gas of said internal combustion engine is higher than said predetermined level.

22. An adsorption device according to claim 21, wherein an interior of said container is sectioned between said inlet and said outlet by a partition wall, which has an opening, to provide a first and a second flow passage, and said adsorbent is disposed in said first flow passage, and wherein at least a portion of a side surface of said adsorbent is exposed to said exhaust gas, which flows through said second flow passage, through said opening.

* * * * *